(12) United States Patent
Hutton et al.

(10) Patent No.: US 12,521,484 B2
(45) Date of Patent: Jan. 13, 2026

(54) IRRIGATION SYSTEM AND METHODS OF USE

(71) Applicant: Osteal Therapeutics, Inc., Dallas, TX (US)

(72) Inventors: Robert C. Hutton, Dallas, TX (US); Brian C. de Beaubien, Dallas, TX (US); Matthew Gill, Dallas, TX (US); Douglas Lorang, Dallas, TX (US); James McCrea, Dallas, TX (US); Jude Paganelli, Dallas, TX (US); Andrew Sauter, Dallas, TX (US); Michael Wong, Dallas, TX (US)

(73) Assignee: Osteal Therapeutics, Inc., Dallas, TX (US)

( * ) Notice: Subject to any disclaimer, the term of this patent is extended or adjusted under 35 U.S.C. 154(b) by 0 days.

(21) Appl. No.: 18/909,211

(22) Filed: Oct. 8, 2024

(65) Prior Publication Data

US 2025/0025629 A1   Jan. 23, 2025

Related U.S. Application Data

(63) Continuation of application No. 18/854,445, filed as application No. PCT/US2024/016660 on Feb. 21, 2024.

(Continued)

(51) Int. Cl.
*A61M 3/02* (2006.01)
*A61K 31/41* (2006.01)
(Continued)

(52) U.S. Cl.
CPC ..... *A61M 5/16809* (2013.01); *A61K 31/4196* (2013.01); *A61K 31/7036* (2013.01);
(Continued)

(58) Field of Classification Search
CPC .... A61M 5/16809; A61M 2005/14208; A61M 2205/3334
See application file for complete search history.

(56) References Cited

U.S. PATENT DOCUMENTS

| 3,572,340 | A | 3/1971 | Lloyd et al. |
| 4,743,232 | A | 5/1988 | Kruger |

(Continued)

FOREIGN PATENT DOCUMENTS

| AU | 2009279487 B2 | 10/2014 |
| AU | 2014253510 B2 | 11/2016 |

(Continued)

OTHER PUBLICATIONS

U.S. Appl. No. 17/401,843, filed Aug. 13, 2021, US 2022-0047392.

(Continued)

*Primary Examiner* — Bhisma Mehta
*Assistant Examiner* — Haden Matthew Ritchie
(74) *Attorney, Agent, or Firm* — Mintz Levin Cohn Ferris Glovsky and Popeo, P.C.

(57) ABSTRACT

A treatment delivery system includes a fluid delivery system connected to a first fluid reservoir and a second fluid reservoir. The system directs a first fluid from the first fluid reservoir to a treatment site and directs a second fluid from the second fluid reservoir to the treatment site and a control unit to control the fluid delivery system according to a treatment process comprising a flow of the first fluid and the second fluid, the treatment process including multiple phases. A first phase includes a controlled delivery of the first fluid from the first fluid reservoir to the treatment site. A second phase of the plurality of phases includes a controlled delivery of the second fluid from the second fluid reservoir to the treatment site, the control unit automatically activating a transition from at least the first phase to the second phase.

42 Claims, 14 Drawing Sheets

Related U.S. Application Data

(60) Provisional application No. 63/613,533, filed on Dec. 21, 2023, provisional application No. 63/596,130, filed on Nov. 3, 2023, provisional application No. 63/519,923, filed on Aug. 16, 2023, provisional application No. 63/493,577, filed on Mar. 31, 2023, provisional application No. 63/486,186, filed on Feb. 21, 2023.

(51) Int. Cl.
*A61K 31/4196* (2006.01)
*A61K 31/70* (2006.01)
*A61K 31/7036* (2006.01)
*A61K 38/14* (2006.01)
*A61M 1/00* (2006.01)
*A61M 5/168* (2006.01)
*A61M 5/142* (2006.01)

(52) U.S. Cl.
CPC ............. *A61K 38/14* (2013.01); *A61M 1/772* (2021.05); *A61M 3/0202* (2021.05); *A61M 2005/14208* (2013.01); *A61M 2205/3334* (2013.01)

(56) References Cited

U.S. PATENT DOCUMENTS

| | | |
|---|---|---|
| 5,106,629 A | 4/1992 | Cartmell et al. |
| 5,176,663 A | 1/1993 | Svedman et al. |
| 5,180,375 A | 1/1993 | Feibus |
| 5,237,993 A | 8/1993 | Skrabal |
| 5,752,974 A | 5/1998 | Rhee et al. |
| 6,010,524 A | 1/2000 | Fleischmann |
| 6,174,306 B1 | 1/2001 | Fleischmann |
| 6,345,623 B1 | 2/2002 | Heaton et al. |
| D469,176 S | 1/2003 | Hall et al. |
| 6,547,255 B1 | 4/2003 | Donaway et al. |
| 6,553,998 B2 | 4/2003 | Heaton et al. |
| D475,134 S | 5/2003 | Randolph |
| 6,557,704 B1 | 5/2003 | Randolph |
| 6,685,681 B2 | 2/2004 | Lockwood et al. |
| 6,695,823 B1 | 2/2004 | Lina et al. |
| 6,695,824 B2 | 2/2004 | Howard et al. |
| D488,558 S | 4/2004 | Hall |
| 6,855,135 B2 | 2/2005 | Lockwood et al. |
| 6,855,860 B2 | 2/2005 | Ruszczak et al. |
| 6,856,821 B2 | 2/2005 | Johnson |
| 6,994,702 B1 | 2/2006 | Johnson |
| 7,004,915 B2 | 2/2006 | Boynton et al. |
| 7,022,113 B2 | 4/2006 | Lockwood et al. |
| 7,108,683 B2 | 9/2006 | Zamierowski |
| 7,128,735 B2 | 10/2006 | Weston |
| 7,160,273 B2 | 1/2007 | Greter et al. |
| 7,182,758 B2 | 2/2007 | McCraw |
| 7,195,624 B2 | 3/2007 | Lockwood et al. |
| 7,198,046 B1 | 4/2007 | Argenta et al. |
| 7,216,651 B2 | 5/2007 | Argenta et al. |
| 7,255,713 B2 | 8/2007 | Malek |
| 7,279,612 B1 | 10/2007 | Heaton et al. |
| 7,316,672 B1 | 1/2008 | Hunt et al. |
| D565,177 S | 3/2008 | Locke et al. |
| 7,338,482 B2 | 3/2008 | Lockwood et al. |
| 7,361,184 B2 | 4/2008 | Joshi |
| 7,438,705 B2 | 10/2008 | Karpowicz et al. |
| 7,485,112 B2 | 2/2009 | Karpowicz et al. |
| 7,517,536 B2 | 4/2009 | Ko |
| 7,534,240 B1 | 5/2009 | Johnson |
| 7,540,848 B2 | 6/2009 | Hannigan et al. |
| 7,553,306 B1 | 6/2009 | Hunt et al. |
| 7,569,742 B2 | 8/2009 | Haggstrom et al. |
| 7,615,036 B2 | 11/2009 | Joshi et al. |
| 7,618,382 B2 | 11/2009 | Vogel et al. |
| 7,674,477 B1 | 3/2010 | Schmid et al. |
| 7,678,102 B1 | 3/2010 | Heaton |
| 7,700,819 B2 | 4/2010 | Ambrosio et al. |
| 7,722,582 B2 | 5/2010 | Lina et al. |
| 7,723,560 B2 | 5/2010 | Lockwood et al. |
| 7,763,769 B2 | 7/2010 | Johnson et al. |
| 7,779,625 B2 | 8/2010 | Joshi et al. |
| 7,790,945 B1 | 9/2010 | Watson, Jr. |
| 7,799,004 B2 | 9/2010 | Tumey |
| 7,837,735 B2 | 11/2010 | Malone |
| 7,838,717 B2 | 11/2010 | Haggstrom et al. |
| 7,842,095 B2 | 11/2010 | Klein |
| 7,909,805 B2 | 3/2011 | Weston |
| 8,007,491 B2 | 8/2011 | Pinto et al. |
| 8,021,347 B2 | 9/2011 | Vitaris et al. |
| 8,048,046 B2 | 11/2011 | Hudspeth et al. |
| 8,070,715 B2 | 12/2011 | Quackenbush et al. |
| 8,070,716 B2 | 12/2011 | Sutrina et al. |
| 8,092,548 B2 | 1/2012 | McKay et al. |
| 8,100,887 B2 | 1/2012 | Weston et al. |
| 8,114,126 B2 | 2/2012 | Heaton et al. |
| 8,128,607 B2 | 3/2012 | Hu et al. |
| 8,177,764 B2 | 5/2012 | Hu et al. |
| 8,211,071 B2 | 7/2012 | Mormino et al. |
| 8,221,396 B2 | 7/2012 | Dehnad et al. |
| 8,246,590 B2 | 8/2012 | Hu et al. |
| 8,251,979 B2 | 8/2012 | Malhi |
| 8,257,328 B2 | 9/2012 | Augustine et al. |
| 8,282,611 B2 | 10/2012 | Weston |
| 8,294,586 B2 | 10/2012 | Pidgeon et al. |
| 8,298,200 B2 | 10/2012 | Vess et al. |
| 8,308,714 B2 | 11/2012 | Weston et al. |
| 8,323,264 B2 | 12/2012 | Weston et al. |
| 8,337,474 B2 | 12/2012 | Hu et al. |
| 8,366,692 B2 | 2/2013 | Weston et al. |
| 8,377,018 B2 | 2/2013 | Bendele et al. |
| 8,403,902 B2 | 3/2013 | Locke et al. |
| D679,819 S | 4/2013 | Peron |
| D679,820 S | 4/2013 | Peron |
| 8,419,710 B2 | 4/2013 | Keimel et al. |
| 8,435,221 B2 | 5/2013 | Hu et al. |
| 8,449,509 B2 | 5/2013 | Weston |
| 8,460,255 B2 | 6/2013 | Joshi et al. |
| 8,491,591 B2 | 7/2013 | Furderer |
| 8,500,819 B2 | 8/2013 | Meridew et al. |
| 8,529,532 B2 | 9/2013 | Pinto et al. |
| 8,535,709 B2 | 9/2013 | Kennedy et al. |
| 8,540,688 B2 | 9/2013 | Eckstein et al. |
| 8,540,699 B2 | 9/2013 | Miller et al. |
| 8,545,466 B2 | 10/2013 | Andresen et al. |
| 8,556,871 B2 | 10/2013 | Mormino et al. |
| 8,562,576 B2 | 10/2013 | Hu et al. |
| 8,568,386 B2 | 10/2013 | Malhi |
| 8,579,872 B2 | 11/2013 | Coulthard et al. |
| 8,585,665 B2 | 11/2013 | Khosrowshahi |
| 8,591,485 B2 | 11/2013 | Lissner et al. |
| 8,628,505 B2 | 1/2014 | Weston |
| 8,641,691 B2 | 2/2014 | Fink et al. |
| 8,641,693 B2 | 2/2014 | Locke et al. |
| 8,663,198 B2 | 3/2014 | Buan et al. |
| 8,663,200 B2 | 3/2014 | Weston et al. |
| 8,663,625 B2 | 3/2014 | Stroock et al. |
| 8,715,256 B2 | 5/2014 | Greener |
| 8,728,046 B2 | 5/2014 | Hu et al. |
| 8,734,409 B2 | 5/2014 | Swain et al. |
| 8,734,410 B2 | 5/2014 | Hall et al. |
| 8,764,732 B2 | 7/2014 | Hartwell |
| 8,771,253 B2 | 7/2014 | Johnson et al. |
| 8,777,911 B2 | 7/2014 | Heagle et al. |
| 8,784,392 B2 | 7/2014 | Vess et al. |
| 8,808,259 B2 | 8/2014 | Walton et al. |
| 8,808,274 B2 | 8/2014 | Hartwell |
| 8,827,983 B2 | 9/2014 | Braga et al. |
| 8,827,986 B2 | 9/2014 | Shachar et al. |
| 8,829,263 B2 | 9/2014 | Haggstrom et al. |
| 8,834,434 B2 | 9/2014 | Hu et al. |
| 8,834,451 B2 | 9/2014 | Blott et al. |
| 8,834,520 B2 | 9/2014 | Argenta et al. |
| 8,852,170 B2 | 10/2014 | Weston et al. |
| 8,864,711 B2 | 10/2014 | McKay |
| 8,895,540 B2 | 11/2014 | DiMauro et al. |

(56) References Cited

U.S. PATENT DOCUMENTS

| | | |
|---|---|---|
| 8,905,983 B2 | 12/2014 | Locke et al. |
| 8,926,575 B2 | 1/2015 | Hu et al. |
| 8,945,030 B2 | 2/2015 | Weston |
| 8,945,074 B2 | 2/2015 | Buan et al. |
| 8,956,336 B2 | 2/2015 | Haggstrom et al. |
| 8,961,481 B2 | 2/2015 | Hu et al. |
| 8,992,509 B2 | 3/2015 | Lowing |
| 9,017,302 B2 | 4/2015 | Vitaris et al. |
| 9,058,634 B2 | 6/2015 | Buan et al. |
| 9,061,064 B2 | 6/2015 | Trieu |
| 9,061,095 B2 | 6/2015 | Adie et al. |
| 9,067,003 B2 | 6/2015 | Buan et al. |
| 9,084,845 B2 | 7/2015 | Adie et al. |
| D738,487 S | 9/2015 | Anderson et al. |
| 9,155,814 B2 | 10/2015 | Shou-Cang et al. |
| 9,155,821 B2 | 10/2015 | Wudyka |
| 9,180,231 B2 | 11/2015 | Greener |
| 9,192,700 B2 | 11/2015 | Weston et al. |
| 9,205,183 B2 | 12/2015 | Hartwell et al. |
| 9,205,235 B2 | 12/2015 | Wiesner |
| 9,211,365 B2 | 12/2015 | Weston |
| 9,220,822 B2 | 12/2015 | Hartwell |
| 9,220,823 B2 | 12/2015 | Nicolini |
| RE45,864 E | 1/2016 | Peron |
| 9,226,737 B2 | 1/2016 | Dunn |
| 9,227,000 B2 | 1/2016 | Fink et al. |
| 9,272,079 B2 | 3/2016 | Lessing et al. |
| 9,272,080 B2 | 3/2016 | Weston |
| 9,283,307 B2 | 3/2016 | Hu et al. |
| 9,289,542 B2 | 3/2016 | Blott et al. |
| 9,302,034 B2 | 4/2016 | Corley |
| 9,327,015 B2 | 5/2016 | Serhan et al. |
| 9,345,823 B2 | 5/2016 | Mormino et al. |
| 9,386,947 B2 | 7/2016 | Johnson |
| 9,414,864 B2 | 8/2016 | Trieu |
| 9,421,133 B2 | 8/2016 | Hu et al. |
| 9,423,062 B2 | 8/2016 | Steele |
| 9,427,505 B2 | 8/2016 | Askem et al. |
| 9,446,178 B2 | 9/2016 | Blott et al. |
| 9,452,245 B2 | 9/2016 | Jaeb et al. |
| 9,456,928 B2 | 10/2016 | Haggstrom et al. |
| RE46,289 E | 1/2017 | Peron |
| 9,545,463 B2 | 1/2017 | Blott et al. |
| 9,545,465 B2 | 1/2017 | Allen et al. |
| 9,579,431 B2 | 2/2017 | Buan et al. |
| 9,585,990 B2 | 3/2017 | Karpowicz et al. |
| 9,592,206 B2 | 3/2017 | Walls |
| 9,610,390 B2 | 4/2017 | Weston |
| 9,623,177 B2 | 4/2017 | Panotopoulos |
| 9,629,986 B2 | 4/2017 | Patel et al. |
| 9,642,954 B2 | 5/2017 | Mormino et al. |
| 9,662,429 B2 | 5/2017 | Pratt et al. |
| 9,669,138 B2 | 6/2017 | Joshi et al. |
| 9,707,008 B2 | 7/2017 | Krebs et al. |
| 9,713,661 B2 | 7/2017 | Coston et al. |
| 9,808,561 B2 | 11/2017 | Adie et al. |
| 9,849,216 B2 | 12/2017 | Austin et al. |
| RE46,669 E | 1/2018 | de Beaubien |
| 9,901,664 B2 | 2/2018 | Askem |
| 9,907,940 B2 | 3/2018 | Pratt et al. |
| RE46,825 E | 5/2018 | Heagle |
| 9,956,121 B2 | 5/2018 | Hartwell |
| 9,956,325 B2 | 5/2018 | Malhi |
| 9,956,327 B2 | 5/2018 | Hartwell |
| 9,956,328 B2 | 5/2018 | Long et al. |
| 9,962,474 B2 | 5/2018 | Greener |
| 9,974,890 B2 | 5/2018 | Hudspeth et al. |
| 9,987,402 B2 | 6/2018 | Hartwell |
| 9,999,547 B2 | 6/2018 | Albert et al. |
| 9,999,711 B2 | 6/2018 | Weston et al. |
| 10,004,835 B2 | 6/2018 | Wiesner |
| 10,016,539 B2 | 7/2018 | Coulthard et al. |
| 10,058,642 B2 | 8/2018 | Weston |
| 10,071,190 B2 | 9/2018 | Hartwell et al. |
| 10,092,452 B2 | 10/2018 | Robinson et al. |
| 10,092,682 B2 | 10/2018 | Locke et al. |
| 10,105,472 B2 | 10/2018 | Pratt et al. |
| 10,111,991 B2 | 10/2018 | Buan et al. |
| 10,124,093 B1 | 11/2018 | Francis et al. |
| 10,130,526 B2 | 11/2018 | Fink et al. |
| 10,143,783 B2 | 12/2018 | Adie et al. |
| 10,154,928 B2 | 12/2018 | Hartwell et al. |
| 10,154,929 B2 | 12/2018 | Corley |
| 10,188,440 B2 | 1/2019 | Sweeney |
| 10,188,441 B2 | 1/2019 | Kim et al. |
| 10,188,776 B2 | 1/2019 | Greener |
| 10,201,642 B2 | 2/2019 | Hartwell et al. |
| 10,219,952 B2 | 3/2019 | Locke et al. |
| 10,265,182 B2 | 4/2019 | Foran |
| 10,272,232 B2 | 4/2019 | Jolly et al. |
| 10,293,105 B2 | 5/2019 | Panotopoulos |
| 10,299,964 B2 | 5/2019 | Askem et al. |
| 10,300,178 B2 | 5/2019 | Buan et al. |
| 10,307,516 B2 | 6/2019 | Aceto et al. |
| 10,314,954 B2 | 6/2019 | Hu et al. |
| 10,322,033 B2 | 6/2019 | Hu et al. |
| 10,328,185 B2 | 6/2019 | Simmons et al. |
| 10,328,187 B2 | 6/2019 | Gordon et al. |
| 10,624,996 B2 | 4/2020 | Gall et al. |
| 10,729,841 B2 | 8/2020 | Vogt et al. |
| 10,864,314 B2 | 12/2020 | Vogt et al. |
| 10,918,770 B2 | 2/2021 | Fewkes et al. |
| 11,051,865 B2 | 7/2021 | Stalcup et al. |
| 11,109,977 B2 | 9/2021 | Vogt et al. |
| 11,123,483 B2 | 9/2021 | Panotopoulos |
| 11,273,044 B2 | 3/2022 | Foran et al. |
| RE49,219 E | 9/2022 | DiMauro et al. |
| 11,452,809 B2 | 9/2022 | Long et al. |
| 11,471,267 B2 | 10/2022 | Gordon |
| 11,471,660 B2 | 10/2022 | Malkowski et al. |
| 11,504,242 B2 | 11/2022 | de Beaubien et al. |
| 12,246,146 B2 | 3/2025 | Rehm et al. |
| 2001/0029956 A1 | 10/2001 | Argenta et al. |
| 2002/0026946 A1 | 3/2002 | McKay |
| 2002/0082567 A1 | 6/2002 | Lockwood et al. |
| 2002/0143286 A1 | 10/2002 | Tumey |
| 2002/0161317 A1 | 10/2002 | Risk et al. |
| 2002/0161346 A1 | 10/2002 | Lockwood et al. |
| 2002/0198503 A1 | 12/2002 | Risk et al. |
| 2003/0014022 A1 | 1/2003 | Lockwood et al. |
| 2003/0040687 A1 | 2/2003 | Boynton et al. |
| 2003/0048185 A1* | 3/2003 | Citrenbaum ...... A61M 5/16895 340/613 |
| 2003/0078532 A1 | 4/2003 | Ruszczak et al. |
| 2003/0093041 A1 | 5/2003 | Risk et al. |
| 2003/0097100 A1 | 5/2003 | Watson |
| 2003/0212357 A1 | 11/2003 | Pace |
| 2004/0006319 A1 | 1/2004 | Lina et al. |
| 2004/0064111 A1 | 4/2004 | Lockwood et al. |
| 2004/0064132 A1 | 4/2004 | Boehringer et al. |
| 2004/0073151 A1 | 4/2004 | Weston |
| 2004/0260230 A1 | 12/2004 | Randolph |
| 2005/0004534 A1 | 1/2005 | Lockwood et al. |
| 2005/0010153 A1 | 1/2005 | Lockwood et al. |
| 2005/0020955 A1 | 1/2005 | Sanders et al. |
| 2005/0070835 A1 | 3/2005 | Joshi |
| 2005/0070858 A1 | 3/2005 | Lockwood et al. |
| 2005/0085795 A1 | 4/2005 | Lockwood et al. |
| 2005/0148913 A1 | 7/2005 | Weston |
| 2005/0203452 A1 | 9/2005 | Weston et al. |
| 2005/0222527 A1 | 10/2005 | Miller et al. |
| 2005/0222528 A1 | 10/2005 | Weston |
| 2005/0222544 A1 | 10/2005 | Weston |
| 2005/0261615 A1 | 11/2005 | Weston |
| 2005/0261642 A1 | 11/2005 | Weston |
| 2006/0015087 A1 | 1/2006 | Risk et al. |
| 2006/0025727 A1 | 2/2006 | Boehringer et al. |
| 2006/0029650 A1 | 2/2006 | Coffey |
| 2006/0041247 A1 | 2/2006 | Petrosenko et al. |
| 2006/0189910 A1 | 8/2006 | Johnson et al. |
| 2006/0257358 A1 | 11/2006 | Wen et al. |
| 2007/0005028 A1 | 1/2007 | Risk et al. |
| 2007/0014837 A1 | 1/2007 | Johnson et al. |
| 2007/0016152 A1 | 1/2007 | Karpowicz et al. |

(56) References Cited

U.S. PATENT DOCUMENTS

| | | |
|---|---|---|
| 2007/0021697 A1 | 1/2007 | Ginther et al. |
| 2007/0027414 A1 | 2/2007 | Hoffman et al. |
| 2007/0032762 A1 | 2/2007 | Vogel |
| 2007/0032778 A1 | 2/2007 | Heaton et al. |
| 2007/0055209 A1 | 3/2007 | Patel et al. |
| 2007/0066946 A1 | 3/2007 | Haggstrom et al. |
| 2007/0078366 A1 | 4/2007 | Haggstrom et al. |
| 2007/0118096 A1 | 5/2007 | Smith et al. |
| 2007/0129660 A1 | 6/2007 | McLeod et al. |
| 2007/0179460 A1 | 8/2007 | Adahan |
| 2007/0219532 A1 | 9/2007 | Karpowicz et al. |
| 2007/0233022 A1 | 10/2007 | Henley et al. |
| 2007/0239139 A1 | 10/2007 | Weston et al. |
| 2007/0265585 A1 | 11/2007 | Joshi et al. |
| 2008/0011667 A1 | 1/2008 | Ruschke |
| 2008/0045964 A1 | 2/2008 | Mishra |
| 2008/0071234 A1 | 3/2008 | Kelch et al. |
| 2008/0071235 A1 | 3/2008 | Locke et al. |
| 2008/0082059 A1 | 4/2008 | Fink et al. |
| 2008/0082168 A1 | 4/2008 | Peterman et al. |
| 2008/0125759 A1 | 5/2008 | Konieczynski et al. |
| 2008/0200906 A1 | 8/2008 | Sanders et al. |
| 2008/0234641 A1 | 9/2008 | Locke et al. |
| 2008/0281281 A1 | 11/2008 | Meyer et al. |
| 2009/0012482 A1 | 1/2009 | Pinto et al. |
| 2009/0054856 A1 | 2/2009 | Mormino et al. |
| 2009/0076467 A1 | 3/2009 | Pinto et al. |
| 2009/0163882 A1 | 6/2009 | Koch et al. |
| 2009/0227969 A1 | 9/2009 | Jaeb et al. |
| 2009/0234260 A1 | 9/2009 | Coward et al. |
| 2009/0234306 A1 | 9/2009 | Vitaris |
| 2009/0234309 A1 | 9/2009 | Vitaris et al. |
| 2009/0254066 A1 | 10/2009 | Heaton et al. |
| 2009/0275922 A1 | 11/2009 | Coulthard et al. |
| 2009/0299251 A1 | 12/2009 | Buan |
| 2009/0299255 A1 | 12/2009 | Kazala, Jr. et al. |
| 2009/0299306 A1 | 12/2009 | Buan |
| 2009/0312727 A1 | 12/2009 | Heaton |
| 2009/0312728 A1 | 12/2009 | Randolph et al. |
| 2010/0010477 A1 | 1/2010 | Augustine et al. |
| 2010/0036333 A1 | 2/2010 | Schenk, III et al. |
| 2010/0036334 A1 | 2/2010 | Heagle et al. |
| 2010/0036367 A1 | 2/2010 | Krohn |
| 2010/0042021 A1 | 2/2010 | Hu et al. |
| 2010/0042059 A1 | 2/2010 | Pratt et al. |
| 2010/0042074 A1 | 2/2010 | Weston et al. |
| 2010/0049150 A1 | 2/2010 | Braga et al. |
| 2010/0087767 A1 | 4/2010 | McNeil |
| 2010/0100075 A1 | 4/2010 | Weston et al. |
| 2010/0106112 A1* | 4/2010 | Vogel .............. A61F 13/05 623/15.12 |
| 2010/0137775 A1 | 6/2010 | Hu et al. |
| 2010/0160879 A1 | 6/2010 | Weston |
| 2010/0160880 A1 | 6/2010 | Weston |
| 2010/0174251 A1 | 7/2010 | Weston |
| 2010/0185164 A1 | 7/2010 | Hartwell et al. |
| 2010/0198173 A1 | 8/2010 | Hu et al. |
| 2010/0198174 A1 | 8/2010 | Hu et al. |
| 2010/0217401 A1 | 8/2010 | de Beaubien |
| 2010/0262094 A1 | 10/2010 | Walton et al. |
| 2010/0262126 A1 | 10/2010 | Hu et al. |
| 2010/0268198 A1 | 10/2010 | Buan et al. |
| 2010/0286638 A1 | 11/2010 | Malhi |
| 2010/0305490 A1 | 12/2010 | Coulthard et al. |
| 2010/0305524 A1 | 12/2010 | Vess et al. |
| 2010/0305526 A1 | 12/2010 | Robinson et al. |
| 2010/0318052 A1 | 12/2010 | Ha et al. |
| 2010/0324510 A1 | 12/2010 | Andresen et al. |
| 2011/0008179 A1 | 1/2011 | Turner et al. |
| 2011/0015585 A1 | 1/2011 | Svedman et al. |
| 2011/0015593 A1 | 1/2011 | Svedman et al. |
| 2011/0060204 A1 | 3/2011 | Weston |
| 2011/0077604 A1 | 3/2011 | Weston |
| 2011/0077605 A1 | 3/2011 | Karpowicz et al. |
| 2011/0087177 A2 | 4/2011 | Weston |
| 2011/0087178 A2 | 4/2011 | Weston |
| 2011/0092871 A1 | 4/2011 | Fabo et al. |
| 2011/0105963 A1 | 5/2011 | Hu et al. |
| 2011/0112492 A1 | 5/2011 | Bharti et al. |
| 2011/0112494 A1 | 5/2011 | Svedman et al. |
| 2011/0130691 A1 | 6/2011 | Hu et al. |
| 2011/0184338 A1* | 7/2011 | McKay .............. A61M 25/007 604/38 |
| 2011/0184362 A1 | 7/2011 | Croizat et al. |
| 2011/0224633 A1 | 9/2011 | Robinson et al. |
| 2011/0257572 A1 | 10/2011 | Locke et al. |
| 2011/0257612 A1 | 10/2011 | Locke et al. |
| 2011/0282309 A1 | 11/2011 | Adie et al. |
| 2012/0035562 A1 | 2/2012 | Locke et al. |
| 2012/0053541 A1 | 3/2012 | Yao et al. |
| 2012/0109083 A1 | 5/2012 | Coulthard et al. |
| 2012/0123359 A1 | 5/2012 | Reed |
| 2012/0136325 A1 | 5/2012 | Allen et al. |
| 2012/0271256 A1 | 10/2012 | Locke et al. |
| 2012/0271257 A1 | 10/2012 | Coulthard et al. |
| 2012/0283672 A1 | 11/2012 | Randolph |
| 2012/0302975 A1 | 11/2012 | Buan et al. |
| 2012/0302977 A1 | 11/2012 | Buan et al. |
| 2013/0096536 A1 | 4/2013 | Kazala, Jr. et al. |
| 2013/0211307 A1 | 8/2013 | Evans et al. |
| 2013/0211334 A1 | 8/2013 | de Beaubien |
| 2013/0261534 A1 | 10/2013 | Niezgoda et al. |
| 2013/0289505 A1 | 10/2013 | Yao et al. |
| 2013/0296816 A1 | 11/2013 | Greener |
| 2013/0331823 A1 | 12/2013 | Askem et al. |
| 2014/0018754 A1 | 1/2014 | Mormino et al. |
| 2014/0058252 A1 | 2/2014 | Varav |
| 2014/0128824 A1 | 5/2014 | Croizat et al. |
| 2014/0207091 A1 | 7/2014 | Heagle et al. |
| 2014/0228755 A1* | 8/2014 | Darrah .............. A61M 5/445 604/113 |
| 2014/0235957 A1 | 8/2014 | Addington et al. |
| 2014/0276499 A1 | 9/2014 | Locke et al. |
| 2014/0276547 A1 | 9/2014 | Lonky et al. |
| 2014/0283847 A1 | 9/2014 | Sanders et al. |
| 2015/0005722 A1 | 1/2015 | Hu et al. |
| 2015/0011954 A1 | 1/2015 | Lattimore et al. |
| 2015/0018786 A1 | 1/2015 | Locke et al. |
| 2015/0065966 A1 | 3/2015 | Adie et al. |
| 2015/0073361 A1 | 3/2015 | Pratt et al. |
| 2015/0112288 A1 | 4/2015 | Robinson et al. |
| 2015/0134068 A1 | 5/2015 | Leonard et al. |
| 2015/0231314 A1 | 8/2015 | Robinson et al. |
| 2015/0366718 A1 | 12/2015 | Ko et al. |
| 2016/0015873 A1 | 1/2016 | Robinson et al. |
| 2016/0038442 A1 | 2/2016 | Twomey et al. |
| 2016/0067104 A1 | 3/2016 | Sarangapani et al. |
| 2016/0095754 A1 | 4/2016 | Andrews et al. |
| 2016/0095966 A1 | 4/2016 | Greener |
| 2016/0144082 A1 | 5/2016 | Weston et al. |
| 2016/0184497 A1 | 6/2016 | Phillips et al. |
| 2016/0220507 A1 | 8/2016 | Zhang |
| 2016/0235896 A1 | 8/2016 | Mormino et al. |
| 2016/0235897 A1 | 8/2016 | Boynton et al. |
| 2016/0250398 A1 | 9/2016 | Barr et al. |
| 2016/0287765 A1 | 10/2016 | Canner et al. |
| 2016/0354535 A1* | 12/2016 | Blott .............. A61M 1/92 |
| 2016/0367371 A1 | 12/2016 | de Beaubien et al. |
| 2017/0020737 A1 | 1/2017 | Zamierowski |
| 2017/0058143 A1 | 3/2017 | Bitler et al. |
| 2017/0080120 A1 | 3/2017 | Levine et al. |
| 2017/0128642 A1 | 5/2017 | Buan |
| 2017/0143878 A1 | 5/2017 | Tanaka |
| 2017/0151286 A1 | 6/2017 | Kutikov et al. |
| 2017/0182230 A1 | 6/2017 | Ingram et al. |
| 2017/0196735 A1 | 7/2017 | Wang et al. |
| 2017/0209641 A1 | 7/2017 | Mercer et al. |
| 2017/0216501 A1 | 8/2017 | Armstrong et al. |
| 2017/0224892 A1 | 8/2017 | Pratt et al. |
| 2017/0246117 A1 | 8/2017 | Helliwell et al. |
| 2017/0246363 A1 | 8/2017 | Pratt et al. |
| 2017/0274124 A1 | 9/2017 | Hartwell |
| 2017/0319758 A1 | 11/2017 | Eddy et al. |
| 2017/0333605 A1 | 11/2017 | Pratt et al. |

(56) References Cited

U.S. PATENT DOCUMENTS

| | | |
|---|---|---|
| 2017/0354542 A1 | 12/2017 | Hannigan et al. |
| 2017/0354767 A1 | 12/2017 | Carr et al. |
| 2018/0000993 A1 | 1/2018 | Zhang |
| 2018/0008756 A1 | 1/2018 | Whyte et al. |
| 2018/0050137 A1 | 2/2018 | Ryu et al. |
| 2018/0104387 A1 | 4/2018 | Braga et al. |
| 2018/0104393 A1 | 4/2018 | Wu et al. |
| 2018/0126051 A1 | 5/2018 | Hall et al. |
| 2018/0140465 A1 | 5/2018 | Dunn et al. |
| 2018/0140466 A1 | 5/2018 | Hunt |
| 2018/0140467 A1 | 5/2018 | Hunt |
| 2018/0140753 A1 | 5/2018 | Askem et al. |
| 2018/0140757 A1 | 5/2018 | Vess et al. |
| 2018/0140822 A1 | 5/2018 | Robinson et al. |
| 2018/0153570 A1 | 6/2018 | Ingram et al. |
| 2018/0185629 A1 | 7/2018 | Luckemeyer et al. |
| 2018/0200414 A1 | 7/2018 | Askem et al. |
| 2018/0200415 A1 | 7/2018 | Coulthard et al. |
| 2018/0214316 A1 | 8/2018 | Robinson et al. |
| 2018/0235646 A1 | 8/2018 | Locke et al. |
| 2018/0250450 A1 | 9/2018 | Blott et al. |
| 2018/0264181 A1 | 9/2018 | Gregory et al. |
| 2018/0280202 A1 | 10/2018 | Pratt et al. |
| 2018/0304065 A1 | 10/2018 | Armstrong et al. |
| 2018/0326129 A1 | 11/2018 | Askem et al. |
| 2018/0333295 A1* | 11/2018 | Landy ................ A61F 7/12 |
| 2018/0353338 A1 | 12/2018 | Locke et al. |
| 2018/0353339 A1 | 12/2018 | Locke et al. |
| 2018/0353340 A1 | 12/2018 | Robinson et al. |
| 2018/0353341 A1 | 12/2018 | Locke et al. |
| 2018/0353344 A1 | 12/2018 | Locke et al. |
| 2018/0353639 A1 | 12/2018 | Locke et al. |
| 2018/0353662 A1 | 12/2018 | Locke et al. |
| 2019/0001030 A1 | 1/2019 | Braga et al. |
| 2019/0001032 A1 | 1/2019 | Weston et al. |
| 2019/0009010 A1 | 1/2019 | Locke et al. |
| 2019/0015258 A1 | 1/2019 | Gowans et al. |
| 2019/0021911 A1 | 1/2019 | Askem et al. |
| 2019/0022289 A1 | 1/2019 | Pratt et al. |
| 2019/0053819 A1 | 2/2019 | Locke et al. |
| 2019/0053955 A1 | 2/2019 | Allen et al. |
| 2019/0070344 A1 | 3/2019 | Collinson et al. |
| 2019/0105202 A1 | 4/2019 | Dunn et al. |
| 2019/0125590 A1 | 5/2019 | Rehbein et al. |
| 2019/0125943 A1 | 5/2019 | Askem et al. |
| 2019/0134284 A1 | 5/2019 | Buan et al. |
| 2019/0142644 A1 | 5/2019 | Askem et al. |
| 2019/0143007 A1 | 5/2019 | Askem et al. |
| 2019/0151156 A1 | 5/2019 | Kieswetter et al. |
| 2019/0151159 A1 | 5/2019 | Gowans et al. |
| 2019/0159793 A1 | 5/2019 | Cotter et al. |
| 2019/0159938 A1 | 5/2019 | Askem et al. |
| 2019/0167863 A1 | 6/2019 | Adie et al. |
| 2019/0167866 A9 | 6/2019 | Hu et al. |
| 2019/0192350 A1 | 6/2019 | Gowans et al. |
| 2019/0192746 A1 | 6/2019 | Buan et al. |
| 2019/0201250 A1 | 7/2019 | Collinson et al. |
| 2019/0231599 A1 | 8/2019 | Dagger et al. |
| 2019/0231600 A1 | 8/2019 | Locke et al. |
| 2019/0231601 A1 | 8/2019 | Locke et al. |
| 2019/0231602 A1 | 8/2019 | Locke et al. |
| 2019/0231939 A1 | 8/2019 | Askem et al. |
| 2019/0231944 A1 | 8/2019 | Dunn et al. |
| 2019/0231945 A1 | 8/2019 | Hartwell et al. |
| 2019/0231946 A1 | 8/2019 | Gregory et al. |
| 2019/0240381 A1 | 8/2019 | Greener |
| 2019/0240385 A1 | 8/2019 | Hartwell et al. |
| 2019/0365956 A1 | 12/2019 | Carmichael et al. |
| 2019/0365961 A1 | 12/2019 | Walti et al. |
| 2020/0009116 A1 | 1/2020 | Borody |
| 2020/0129679 A1 | 4/2020 | Zink et al. |
| 2020/0197712 A1 | 6/2020 | Limem et al. |
| 2020/0229932 A1 | 7/2020 | Arbuck |
| 2020/0246511 A1 | 8/2020 | Noblitt |
| 2020/0246604 A1 | 8/2020 | Asefi et al. |
| 2020/0316269 A1 | 10/2020 | Lessing et al. |
| 2020/0323695 A1 | 10/2020 | Sides et al. |
| 2020/0330660 A1 | 10/2020 | Patel et al. |
| 2020/0330661 A1 | 10/2020 | Canner et al. |
| 2020/0375890 A1 | 12/2020 | Mitchnick et al. |
| 2020/0406017 A1 | 12/2020 | Moilanen et al. |
| 2021/0069409 A1 | 3/2021 | Castleberry et al. |
| 2021/0077114 A1 | 3/2021 | Bonutti |
| 2021/0128815 A1* | 5/2021 | Byrne ................ A61M 3/0202 |
| 2021/0154403 A1 | 5/2021 | Schmitz et al. |
| 2021/0228777 A1 | 7/2021 | Rose et al. |
| 2021/0386551 A1 | 12/2021 | Castleberry et al. |
| 2021/0401979 A1 | 12/2021 | Majeti et al. |
| 2022/0031934 A1 | 2/2022 | Locke et al. |
| 2022/0047392 A1 | 2/2022 | de Beaubien et al. |
| 2022/0125834 A1 | 4/2022 | Vert-Wong |
| 2022/0211645 A1 | 7/2022 | Brown |
| 2022/0241076 A1 | 8/2022 | Bressner et al. |
| 2022/0249238 A1 | 8/2022 | Link et al. |
| 2022/0273213 A1* | 9/2022 | Sokolov ............. A61B 5/02055 |
| 2022/0287972 A1 | 9/2022 | Tägil et al. |
| 2022/0346964 A1 | 11/2022 | Spenciner et al. |
| 2022/0347051 A1* | 11/2022 | Hatamian ................ A61J 1/10 |

FOREIGN PATENT DOCUMENTS

| | | |
|---|---|---|
| EP | 2175908 B1 | 8/2016 |
| EP | 3235525 B1 | 11/2018 |
| EP | 3423123 A1 | 1/2019 |
| EP | 3463501 A1 | 4/2019 |
| EP | 3493860 A1 | 6/2019 |
| GB | 2336546 B | 6/2000 |
| WO | WO-93/09727 A1 | 5/1993 |
| WO | WO-03/101508 A2 | 12/2003 |
| WO | WO-2007/019038 A2 | 2/2007 |
| WO | WO-2009/016603 A2 | 2/2009 |
| WO | WO-2009047524 A2 | 4/2009 |
| WO | WO-2011/124388 A1 | 10/2011 |
| WO | WO-2012/027913 A1 | 3/2012 |
| WO | WO-2013/064852 A1 | 5/2013 |
| WO | WO-2014/043225 A2 | 3/2014 |
| WO | WO-2017/077226 A1 | 5/2017 |
| WO | WO-2017/077227 A1 | 5/2017 |
| WO | WO-2017/197357 A1 | 11/2017 |
| WO | WO-2018/136232 A1 | 7/2018 |
| WO | WO-2018/158250 A1 | 9/2018 |
| WO | WO-2018/162613 A1 | 9/2018 |
| WO | WO-2018/164803 A1 | 9/2018 |
| WO | WO-2018/167199 A1 | 9/2018 |
| WO | WO-2018/170151 A1 | 9/2018 |
| WO | WO-2018/150267 A3 | 11/2018 |
| WO | WO-2018/158250 A4 | 11/2018 |
| WO | WO-2018/206420 A1 | 11/2018 |
| WO | WO-2019/083966 A1 | 5/2019 |
| WO | WO-2019/086341 A1 | 5/2019 |
| WO | WO-2019/086475 A1 | 5/2019 |
| WO | WO-2019/113091 A1 | 6/2019 |
| WO | WO-2019/129581 A2 | 7/2019 |
| WO | WO-2019/133083 A1 | 7/2019 |
| WO | WO-2019/135900 A1 | 7/2019 |
| WO | WO-2019/139829 A1 | 7/2019 |
| WO | WO-2019/140448 A1 | 7/2019 |
| WO | WO-2019/152140 A1 | 8/2019 |
| WO | WO-2024/178093 A1 | 8/2024 |

OTHER PUBLICATIONS

U.S. Appl. No. 17/971,080, filed Oct. 21, 2022, US 2023-0041597.
U.S. Appl. No. 18/778,749, filed Jul. 19, 2024, US 2024-0366390.
PCT/US2024/16687, Feb. 21, 2024, WO 2024/178093.
PCT/US2024/16660, Feb. 21, 2021, WO 2024/178070.
3M. (2021). 3M™ V.A.C.® Ulta 4 Therapy Unit with 3M™ V.A.C.® Therapy. 3M. Retrieved Oct. 3, 2024, from https://multimedia.3m.com/mws/media/1939201O/v-a-c-ulta-4-therapy-system-user-guide-poster.pdf?&fn=vac-ulta-4-therapy-user-poster-uk-70-2013-1106-8_R3.pdf. 2 pages.

(56) References Cited

OTHER PUBLICATIONS

Acelity. (2017). V.A.C. Ulta 4 Therapy System: User Manual for Clinicians. KCI Licensing, Inc. 200 pages. https://multimedia.3m.com/mws/media/1909966O/417282a-mnl-vaculta-1-5-user-web.pdf.

KCI. (2013). V.A.C. Ulta Quick Reference Guide. KCI Licensing, Inc. Web. Nov. 26, 2024. 24 pages.

Kim P.J. et al. (2019). "Negative pressure wound therapy with instillation: International consensus guidelines update." Int Wound J. 2019;1-13. https://doi.org/10.1111/iwj.13254.

Solventum. (n.d.). 3M™ V.A.C. Ulta Therapy Unit. Solventum. Retrieved Jan. 2, 2025. Web. 3 pages. https://www.3m.com/3M/en_US/p/d/b5005265197/.

Thabe, H. et al. (2007). "Two-stage Reimplantation with an Application Spacer and Combined with Delivery of Antibiotics in the Management of Prosthetic Joint Infection" Oper. Orthop Traumatol, 1:78-100. [German language and English language].

Whiteside, L. et al. (2011). "Methicillin-resistant *Staphylococcus aureus* in TKA Treated With Revision and Direct Intraarticular Antibiotic Infusion." Clin Orthop Relat Res, 469:26-33.

\* cited by examiner

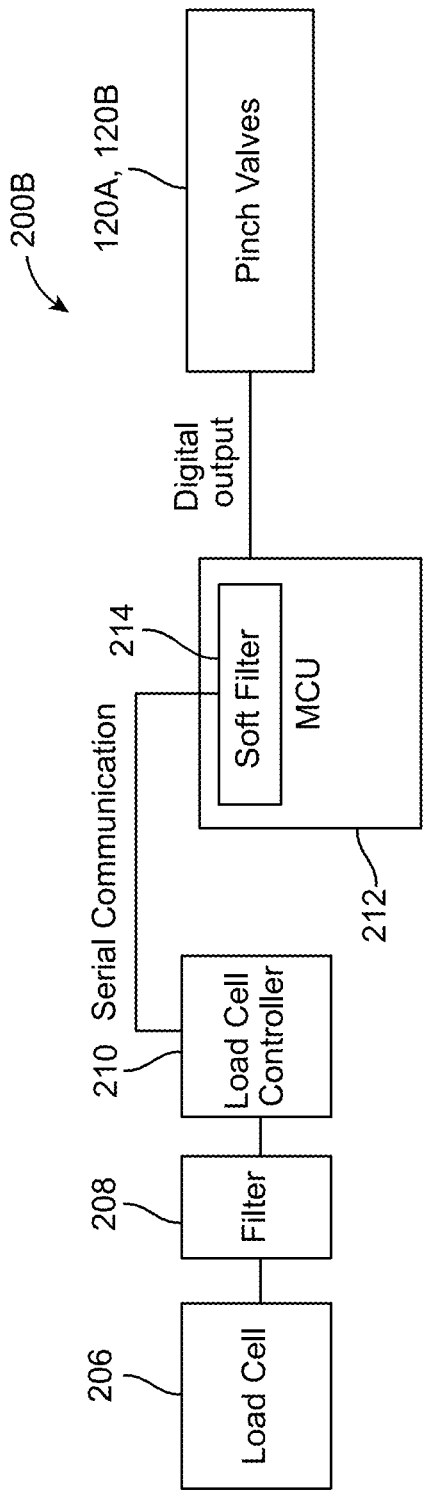
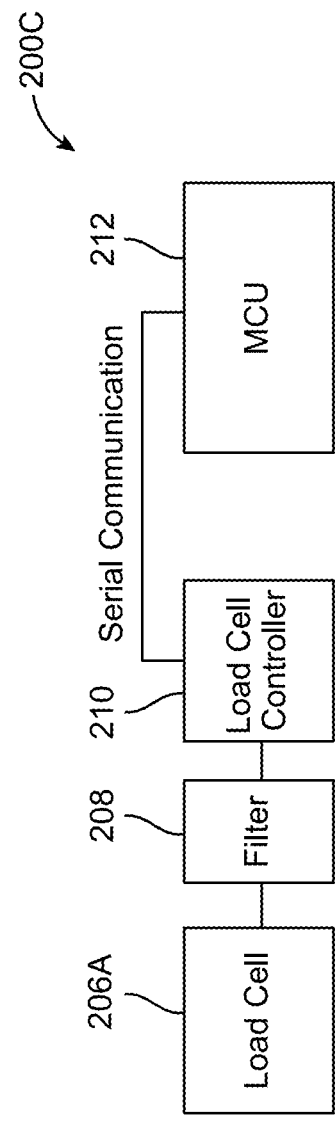
FIG. 2B
FIG. 2C

IRRIGATION SYSTEM AND METHODS OF USE

CROSS-REFERENCES TO RELATED APPLICATIONS

This application is a continuation of U.S. patent application Ser. No. 18/854,445 filed Oct. 4, 2024, which is a National Stage filing under 35 U.S.C. § 371 of International Application Serial No. PCT/US2024/016660, filed Feb. 21, 2024, which claims the benefit of priority under 35 U.S.C. 119(e) to (1) U.S. Provisional Patent Application Ser. No. 63/486,186, filed Feb. 21, 2023; (2) U.S. Provisional Patent Application Ser. No. 63/493,577, filed Mar. 31, 2023; (3) U.S. Provisional Patent Application Ser. No. 63/519,923, filed Aug. 16, 2023; (4) U.S. Provisional Patent Application Ser. No. 63/596,130, filed Nov. 3, 2023; and (5) U.S. Provisional Patent Application Ser. No. 63/613,533 filed Dec. 21, 2023. The disclosures of the patent applications are incorporated by reference herein in their entireties.

TECHNICAL FIELD

The present disclosure generally relates to methods, systems, and devices for irrigation of biological tissue. In particular, the description relates to devices and methods for automatic delivery of multiple types of medicaments, such as antibiotics, into a surgical site.

BACKGROUND

Artificial joint arthroplasty can lead to periprosthetic joint infection, which can be associated with severe complications. The periprosthetic joint infection treatment protocol typically includes surgery and administration of systemic antibiotics to eradicate the infection. Local irrigation of antibiotics can increase antibiotic concentrations at the infected site compared to systemic administration while maintaining safe systemic levels. Improved treatment techniques based on a standardized antibiotic delivery protocol can form the basis of successfully managing prosthetic joint infections. For example, a combination of devices, fluid delivery control unit, and negative pressure waste removal can provide an increased control of the placement and removal of the fluids, superior cleansing, maintenance of proper joint structures, leading to a superior treatment of the patient's infection with increased efficiency and success rate.

SUMMARY

For purposes of summarizing, certain aspects, advantages, and novel features have been described herein. It is to be understood that not all such advantages can be achieved in accordance with any one particular implementation. Thus, the disclosed subject matter can be embodied or carried out in a manner that achieves or optimizes one advantage or group of advantages without achieving all advantages as can be taught or suggested herein.

In accordance with some implementations of the disclosed subject matter, manufactured articles, devices, systems and methods are provided for automated control of fluid delivery to a treatment site.

In an aspect, provided is a treatment delivery system including a fluid delivery system connected to a first fluid reservoir and a second fluid reservoir, the fluid delivery system configured to direct a first fluid from the first fluid reservoir to a treatment site and configured to direct a second fluid from the second fluid reservoir to the treatment site. A control unit is configured to control the fluid delivery system according to a treatment process including a flow of the first fluid and the second fluid. The treatment process includes a plurality of phases. A first phase of the plurality of phases includes a controlled delivery of the first fluid from the first fluid reservoir to the treatment site. A second phase of the plurality of phases includes a controlled delivery of the second fluid from the second fluid reservoir to the treatment site. The control unit automatically activates a transition from at least the first phase to the second phase of the plurality of phases.

The treatment delivery system can include a first load cell configured to detect a combined weight of a first weight of the first fluid in the first fluid reservoir and a second weight of the second fluid in the second fluid reservoir. The control unit processes the combined weight to monitor a status of fluid delivery. The first load cell can be arranged within a vertical plane of the system and can be configured to be contacted horizontally by a cantilevered hanger component. The first fluid reservoir can be held by an attachment feature at a first end region of the cantilevered hanger component and the first load cell can be contacted by a protrusion at a second end region of the cantilevered hanger component. The system can further include a collecting fluid canister configured to collect a fluid removed from the treatment site. A second load cell can be included that is configured to detect a waste weight of the waste fluid canister and any waste within the canister. The control unit can process the waste weight to monitor a status of fluid removal. The second load cell can be arranged within the vertical plane of the system and can be configured to be contacted horizontally by a second cantilevered hanger component. The canister can be held by an attachment feature at a first end region of the second cantilevered hanger component and the second load cell can be contacted by a second protrusion at a second end region of the second cantilevered hanger component.

The fluid delivery system can further include a first pinch valve and a second pinch valve. The first pinch valve can be configured to receive a first fluid delivery line fluidly connected to the first fluid reservoir and the second pinch valve can be configured to receive a second fluid delivery line fluidly connected to the second fluid reservoir. The first pinch valve can be controlled by the control unit to be open during the first phase and can be controlled by the control unit to be closed during the second phase. The second pinch valve can be controlled by the control unit to be closed during the first phase and can be controlled by the control unit to be open during the second phase. The first pinch valve can have a first inner dimension when in an open configuration and the second pinch valve can have a second inner dimension when in an opening configuration. The first inner dimension can be smaller than the second inner dimension. The first fluid delivery line can have a smaller outer dimension than the second fluid delivery line, the smaller outer dimension sized to be received within the first inner dimension of the first pinch valve. The second fluid delivery line can have an outer dimension prevented from being received within the first inner dimension of the first pinch valve.

The control unit can include a pump configured to generate a set vacuum pressure within the system; and a valve configured to control a vacuum relief. The pump can be powered off during at least the first phase. The pump can be configured to run at approximately constant voltage during a first period of time and at an approximately constant torque during a second period of time to generate set vacuum pressure. The system can further include a leak alarm configured to generate an alert indicating a pressure leak determined in response to the control unit detecting a vacuum pressure at the treatment site being below a respective threshold.

The plurality of phases can include a third phase to maintain a volume of the first fluid or the second fluid at a portion of the treatment site for a period of time. The plurality of phases can include a fourth phase that is automatically initiated by the control unit following the first phase to remove the first fluid from the treatment site and following the second phase to remove the second fluid from the treatment site. The system can include a collecting fluid canister configured to collect a fluid removed from the treatment site during the fourth phase of the plurality of phases. The system can include a collecting fluid canister fill sensor configured to generate a collecting fluid canister fill alert indicating a fill level of the collecting fluid canister being above a fill threshold during the fourth phase of the plurality of phases. The control unit can stop removal of any of the first fluid and the second fluid from the treatment site in response to the collecting fluid canister fill alert. The system can include an empty fluid reservoir alarm configured to generate an alert indicating that a weight of the first fluid delivered or a weight of the second fluid delivered is below a minimum threshold corresponding to a respective phase of the plurality of phases. The system can include a low battery alarm configured to generate an alert indicating a charge level of the battery of the control unit. The charge level of the battery can be determined in response to the control unit detecting the charge level of the battery being below a minimum charge level adequate for powering automatic transition between the plurality of phases. The system can include an incorrect assembly alarm configured to generate an alert indicating an incorrect assembly of the treatment delivery system. The incorrect assembly can be determined in response to the control unit detecting a missing or incorrectly coupled component of the treatment delivery system that prevents an automatic transition between the plurality of phases. The system can include a motion alarm configured to pause fluid delivery and generate an alert indicating an excessive motion that affects a weight sensor reading during fluid delivery. The system can include a user interface configured to receive a user input having a selection of an operation for initiating a sequence comprising the plurality of phases. The first fluid can include tobramycin sulfate and the second fluid can include vancomycin hydrochloride.

In an interrelated aspect, provided is a method including controlling, by a control unit, a fluid flow of a treatment solution from a fluid reservoir to a treatment site through a fluid delivery line during a fluid delivery phase; activating, by the control unit, a transition from the fluid delivery phase to a fluid soaking phase during which the treatment solution is maintained at the treatment site; and initiating, by the control unit, a removal of the treatment solution from the treatment site to a collection canister, during a fluid removal phase.

The control unit can include a pump configured to generate a set vacuum pressure at the treatment site; and a valve configured to control a vacuum relief. The pump can be configured to run at approximately constant voltage during a first period of time and at an approximately constant torque during a second period of time to generate the set vacuum pressure. The method can further include generating, by a leak alarm, an alert indicating a pressure leak determined in response to the control unit detecting the vacuum pressure of the system being below a respective threshold. The fluid delivery phase, the soaking phase, and the fluid removal phase can be sequentially repeated during a period of time. The treatment solution can include a first treatment solution stored in a first fluid reservoir and a second treatment solution stored in a second fluid reservoir. The method can include generating a collecting fluid canister fill alert indicating a fill level of the collecting fluid canister being above a fill threshold. The method can include generating an alert indicating that a weight of the fluid reservoir is lower than a minimum threshold before the fluid delivery phase. The method can include generating an alert indicating a charge level of the battery of the control unit is below a minimum charge level adequate for powering automatic transition between treatment phases. The method can include detecting, by the control unit, a missing or incorrectly coupled component of the treatment delivery system; generating an alert indicating an incorrect assembly of the treatment delivery system; and preventing an automatic transition between treatment phases. The method can include generating an alert indicating an excessive motion that affects a weight sensor reading during fluid delivery.

In an interrelated aspect, provided are non-transitory storage media storing instructions that, when executed by at least one processor, cause the at least one processor to perform operations including controlling a fluid flow of a treatment solution from a fluid reservoir to a treatment site through a fluid delivery line during a fluid delivery phase; activating a transition from the fluid delivery phase to a fluid soaking phase during which the treatment solution is maintained at the treatment site; and controlling a removal of the treatment solution from the treatment site to a collection canister during a fluid removal phase.

In an interrelated aspect, provided is a kit for treating a localized infection in a human patient including at least one antibiotic and an irrigation apparatus configured to locally irrigate a treatment site of localized infection with at least one dose of the at least one antibiotic. The irrigation apparatus includes a fluid delivery system configured to connect to a fluid reservoir containing the at least one dose in solution; and a control unit configured to control the fluid delivery system according to a treatment process. The kit includes instructions for administering the at least one dose of the at least one antibiotic using the irrigation apparatus to treat the localized infection. The treatment process locally administers in a 24-hour period a total amount of the at least one antibiotic that exceeds a maximum recommended daily systemic dose of the at least one antibiotic.

The at least one antibiotic can be vancomycin and/or tobramycin. The treatment process can locally administer in a 24-hour period a total amount of vancomycin that exceeds a maximum recommended daily systemic dose for vancomycin or can locally administer in a 24-hour period a total amount of tobramycin that exceeds a maximum recommended daily systemic dose for tobramycin. A first fluid reservoir can contain a first fluid containing the vancomycin and a second fluid reservoir can contain a second fluid containing the tobramycin. The fluid delivery system can be configured to direct the first fluid from the first fluid reservoir to the treatment site and can be configured to direct the second fluid from the second fluid reservoir to the treatment site. The treatment process can include a plurality of phases. A first phase of the plurality of phases can be a controlled delivery of the first fluid from the first fluid reservoir to the treatment site and a second phase of the plurality of phases can be a controlled delivery of the second fluid from the second fluid reservoir to the treatment site. The control unit can automatically activate a transition from at least the first phase to the second phase of the plurality of phases.

The kit can further include a collecting fluid canister configured to collect a fluid removed from the treatment site. The irrigation apparatus can further include a first load cell configured to detect a combined weight of a first weight of the first fluid in the first fluid reservoir and a second weight of the second fluid in the second fluid reservoir. The control unit can process the combined weight to monitor a status of fluid delivery. The first load cell can be arranged within a vertical plane of the fluid delivery system and configured to be contacted horizontally by a cantilevered hanger component. The first fluid reservoir can be held by an attachment feature at a first end region of the cantilevered hanger component and the first load cell contacted by a protrusion at a second end region of the cantilevered hanger component. The irrigation apparatus can further include a second load cell configured to detect a waste weight of the waste fluid canister and any waste within the canister. The control unit can process the waste weight to monitor a status of fluid removal. The second load cell can be arranged within the vertical plane of the system and be configured to be contacted horizontally by a second cantilevered hanger component.

The fluid delivery system can further include a first pinch valve and a second pinch valve. The irrigation apparatus can further include a first fluid delivery line and a second fluid delivery line. The first pinch valve can be configured to receive the first fluid delivery line fluidly connected to the first fluid reservoir and the second pinch valve can be configured to receive the second fluid delivery line fluidly connected to the second fluid reservoir. The first pinch valve can be controlled by the control unit to be open during the first phase and can be controlled by the control unit to be closed during the second phase. The second pinch valve can be controlled by the control unit to be closed during the first phase and is controlled by the control unit to be open during the second phase. The first pinch valve has a first inner dimension when in an open configuration and the second pinch valve has a second inner dimension when in an opening configuration. The first inner dimension can be smaller than the second inner dimension. The first fluid delivery line can have a smaller outer dimension than the second fluid delivery line, the smaller outer dimension sized to be received within the first inner dimension of the first pinch valve. The second fluid delivery line can have an outer dimension prevented from being received within the first inner dimension of the first pinch valve.

The control unit can include a pump configured to generate a set vacuum pressure within the system; and a valve configured to control a vacuum relief. The pump can be powered off during at least the first phase. The pump can be configured to run at approximately constant voltage during a first period of time and at an approximately constant torque during a second period of time to generate set vacuum pressure.

In an interrelated implementation, provided is a kit for managing localized pain in a human patient including at least one therapeutic that an anesthetic or an analgesic; and an irrigation apparatus configured to locally irrigate a treatment site of localized pain with at least one dose of the at least one therapeutic. The irrigation apparatus includes a fluid delivery system configured to connect to a fluid reservoir containing the at least one dose in solution; and a control unit configured to control the fluid delivery system according to a treatment process. The kit further includes instructions for administering the at least one dose of the at least one therapeutic using the irrigation apparatus to treat the localized pain. The at least one therapeutic can be lidocaine. The irrigation apparatus can be configured to locally administer in a 24-hour period a total amount of lidocaine that equals or exceeds a total daily amount permitted for systemic administration of lidocaine. The at least one therapeutic can be lidocaine and at least one antimicrobial agent.

In an interrelated implementation, provided is a kit for managing localized antifungal therapy in a human patient including at least one antifungal agent; and an irrigation apparatus configured to locally irrigate a treatment site of localized fungal infection with at least one dose of the at least one antifungal agent. The irrigation apparatus includes a fluid delivery system configured to connect to a fluid reservoir containing the at least one dose in solution; and a control unit configured to control the fluid delivery system according to a treatment process. The kit further includes instructions for administering the at least one dose of the at least one antifungal agent using the irrigation apparatus to provide the patient continuous localized antifungal therapy for at least a 24-hour period. The at least one antifungal agent can be fluconazole. The irrigation apparatus can be configured to locally administer in the 24-hour period a total amount of fluconazole that equals or exceeds a total daily amount permitted for systemic administration of fluconazole. The kit can further include at least two antimicrobial agents. The at least one antifungal agent can be fluconazole and the at least two antimicrobial agents are vancomycin and tobramycin.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 2A-2F illustrate block diagrams of components of the treatment delivery system performing respective functions, in accordance with some example implementations.

When practical, similar reference numbers denote similar structures, features, or elements.

DETAILED DESCRIPTION

Figure 1A:
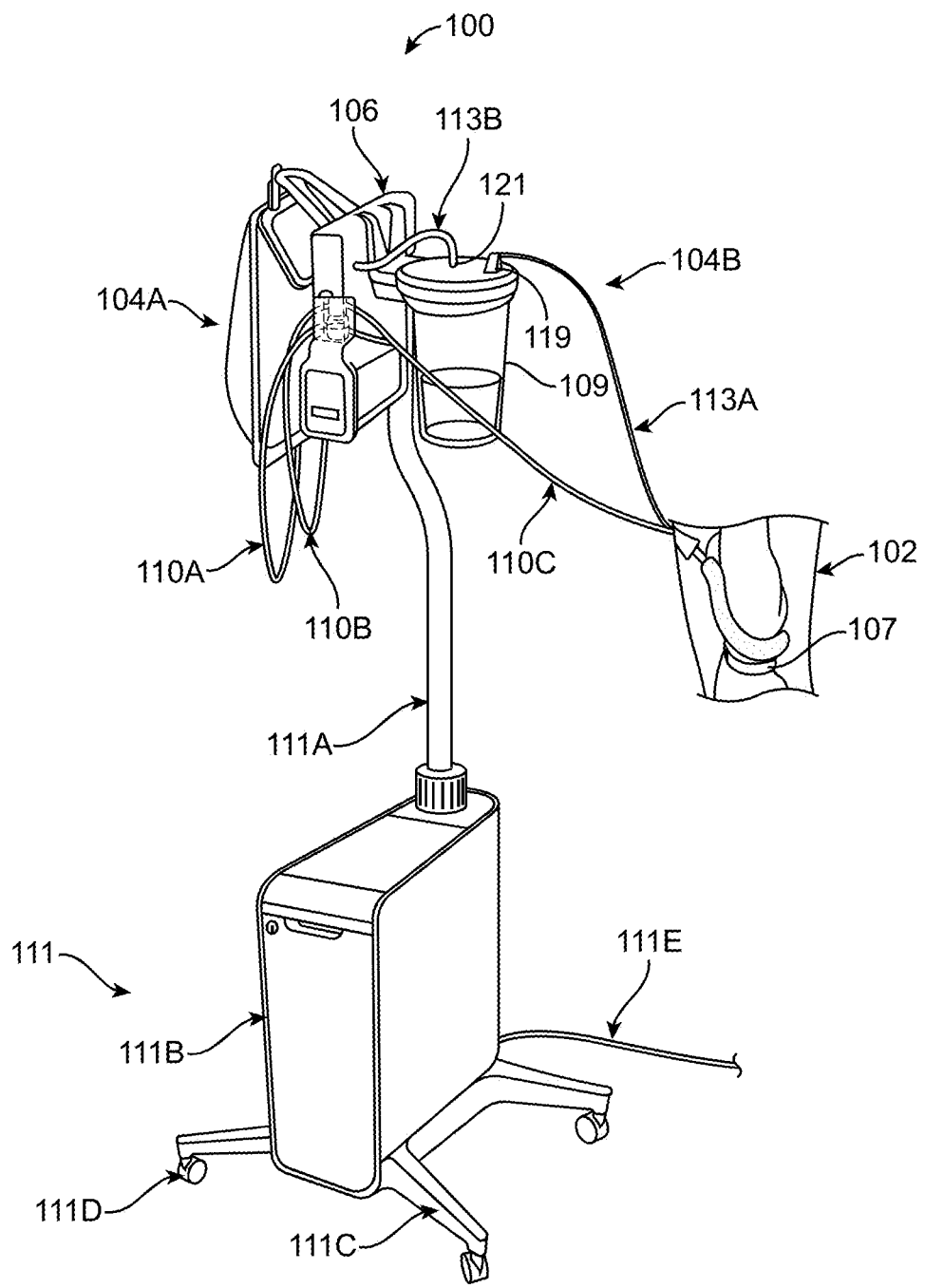
FIG. 1A shows an example of a treatment delivery system.

The disclosed subject matter relates to a treatment delivery system that can administer the delivery and removal of fluid to a treatment site. The treatment delivery system can include a control unit to control a treatment process including flow of multiple fluids during multiple phases. The treatment delivery system can deliver a first volume of a first fluid during a first phase and, after first fluid removal, the treatment delivery system can deliver a second fluid during a second phase. The control unit can automatically activate a transition from one phase to another phase, while verifying parameters corresponding to respective phases to ensure correct functionality of the applied treatment to enable an optimized treatment.

As an advantage of the proposed solution described herein, the treatment delivery system described herein can execute a (24-hour) cycle of processes in accordance with a clinical protocol without user interaction. The treatment delivery system can switch seamlessly between different phases of the treatment to deliver a set fluid volume of selected fluid types stored in separate reservoirs, according to the clinical protocol. The treatment delivery system enables monitoring of irrigation performance with high accuracy.

The treatment delivery system can deliver irrigants, such as an antibiotic irrigants, with precise fluid flow control, driven by gravity (i.e., fixed head height between irrigant and treatment site) and either active or residual vacuum assist (i.e., pump turned on or off), combined discrete logic components incorporated onto a processor, load cells (weight sensors), a pneumatic solenoid valve, and pinch valve(s). One load cell sensor of the treatment delivery system outputs a signal that reflects the combined fluid level/weight of the fluid reservoirs (e.g., solution bags). Another load cell sensor of the treatment delivery system measures the weight of the canister to monitor fluid removed from the treatment site for potential blockages or a full waste collection canister. A control circuit monitors the differential weight (e.g., change in fluid level) to open or close a pinch valve on the fluid delivery line to dispense a preset fluid volume. As another advantage of the proposed solution described herein, the use of load cell sensors enables identification of critical conditions (i.e., risk mitigation of potential treatment hazards). For example, the first load cell sensor can detect a rapid reduction in differential weight that indicates a reservoir to fluid delivery line connection leak or can detect the device is incorrectly assembled by sensing no weight that indicates a user has failed to hang a fluid reservoir on the control unit or that the fluid reservoirs are empty. The second load cell sensor can measure the weight of the canister to monitor fluid removed from the treatment site for potential blockages or full canisters. This second load cell sensor can detect an insufficient differential weight during fluid removal that indicates fluid delivery blockage, empty bag, tubing kink, or other fluid delivery issues can be identified by the treatment delivery system. The control unit can achieve a vacuum pressure (e.g., 0 mmHg to −125 mmHg, preferably about −25 mmHg) that assists the gravity-driven fluid delivery process. The pump need not be actively pumping during fluid delivery with the system. For example, the pump can be off and residual vacuum in combination with gravity due to a head height of the reservoir bags can cause fluid to be delivered to the patient. However, it should be appreciated the system can be configured to achieve fluid delivery using active pumping so that the pump remains in an active state while fluid is being delivered to the treatment site. The control unit monitors load cell readings that are outside a window of acceptable tolerances that would impair the accuracy of the fluid delivery, for example, due to movement of the system and/or the solution bags, or any excessive motion of the system can impact the load cell readings. Other advantages of the treatment delivery system are discussed with reference to FIGS. 1-8.

FIGS. 1A-1D show an example of a treatment delivery system 100 that can provide controlled local delivery of fluids into a treatment site 102. In general, the treatment delivery system 100 can include a (portable) disposable device for enabling adjustment of a distance between the treatment delivery system 100 and a treatment site 102 of a patient, such as a patient suffering from an infection treatable with local fluid irrigation. The treatment delivery system can also be designed to mount to an accessory pole unit with a fixed distance between the treatment delivery system 100 and a treatment site 102 of a patient, such that the head height remains consistent throughout treatment. In the example illustrated in FIG. 1A, the treatment delivery system 100 provides irrigation to a treatment site 102 including an irrigable volume (e.g., joint space or bone segment). The treatment delivery system 100 can include a fluid delivery system 104A, a fluid collection system 104B, and a control system 106. The fluid delivery system 104A can include one or more fluid reservoirs 108A, B held by corresponding attachment features 114A, B. The fluid collection system 104B can include one or more collection fluid canisters 109 held by corresponding attachment features 114B.

The control system 106 can include a vacuum pressure source (e.g., pump 226 described with reference to FIG. 2D and FIG. 3A) configured to create vacuum pressure within the treatment system so that residual vacuum pressure in combination with gravity due to a head height of the reservoirs 108 draw fluid from the fluid reservoirs 108 towards the treatment site 102 through fluid delivery lines 110A, 110B, 110C. The vacuum pressure source is also configured to draw fluid away from the treatment site 102 toward the fluid collection system 104B through vacuum lines 113A, 113B. The control system 106 controls fluid through the fluid delivery lines 110A, 110B, 110C, and vacuum lines 113A, 113B according to a treatment protocol. The treatment site 102 can include a connection mechanism 116 such as a sealable connection with a catheter and/or cannulas that conduct the fluid transcutaneously to irrigation devices deployed within treated area (e.g., infected tissue and/or infected joints, such as hip, knee, shoulder, wrist, ankle). Although not shown, one or more other medical devices may be assisting and working in coordination and/or parallel with the treatment delivery system 100 to provide treatment for the patient (including the treatment site 102).

As a route of administration, irrigation means to administer, such as by bathing or flushing, an irrigant to a treatment site, such as an open wound or a body cavity. Irrigation is bi-directional in that the irrigant that is delivered to the treatment site is also removed from the treatment site via aspiration. Delivery of a fluid to the treatment site may be referred to herein as instillation.

Some therapeutics, such as certain antibiotics, are commonly administered systemically (e.g., intravenously), which has high risk of systemic toxicity. Local instillation of an antibiotic in solution for the treatment of periprosthetic joint infection (PJI) has been reported using repeated doses of antibiotics delivered via catheter to the periprosthetic tissue or joint space following aggressive debridement and one-stage exchange of the prosthesis. Local instillation is a unidirectional delivery of the antibiotic to the treatment site in which none of the instilled antibiotic is aspirated or flushed from the treatment site. Installation doses, therefore, are absorbed in the tissue and bloodstream such that systemic toxicity considerations also limit the local dose and concentration that may be safely administered by instillation. Whiteside et al. reported that instillation of very high concentrations of vancomycin (50,000-100,000 μg/mL) once or twice daily into the joint space resulted in serum concentrations exceeding safe limits in multiple patients, which required a reduction in the instilled dose and concentration (see *Clin Orthop Relat Res* (2011) 469:26-33). Although the peak and trough concentrations of vancomycin in the joint space exceeded serum concentrations and were sustained above minimum inhibitory concentration (MIC) of vancomycin for common organisms susceptible to vancomycin, the sustained local concentration was limited by exceeding safe systemic concentrations and was not maintained at or above minimum biofilm eradication concentration (MBEC) of vancomycin (greater than 4,000 μg/mL) for multiple common PJI organisms. Similarly, the maximum daily dose provided by this instillation method was 1,000 mg.

Described herein are systems that deliver via irrigation (e.g., instillation and subsequent aspiration) one or more doses of at least one therapeutic as an irrigant (e.g., at least one therapeutic in solution) to a treatment site (e.g., periprosthetic tissue, joint space, etc.) to treat a condition (e.g., localized bacterial or fungal infection, or localized pain, etc.) at the treatment site. The systems described herein can control the treatment according to a treatment process. For example, the treatment process may locally administer in a 24-hour period a total amount of the at least one therapeutic that equals or exceeds a maximum recommended daily systemic dose for that therapeutic. The total daily dosage of the therapeutic irrigant can substantially exceed the maximum recommended daily systemic dose of the therapeutic without the toxicity risks associated with systemic administration.

In some implementations, the antibiotic vancomycin can be administered locally as an irrigant using the systems described herein at a total dose that exceeds 3,000 mg/day in a 24-hour period to treat a localized infection, for example, over 3,000 mg/day, about 4,000 mg/day, about 5,000 mg/day, about 6,000 mg/day, about 7,000 mg/day, about 7,500 mg/day up to about 40,000 mg/day. As another example, the antibiotic tobramycin can be administered locally as an irrigant using the systems at a total dose that exceeds 100 mg/day in a 24-hour period up to about 1,000 mg/day, up to about 1,250 mg/day to treat a localized infection.

As another example, the treatment process may locally administer at least one therapeutic that is an antifungal agent that is administered to locally irrigate a treatment site that is a localized fungal infection to provide the patient continuous localized antifungal therapy for at least a 24-hour period. The antifungal can be fluconazole locally administered in a 24-hour period a total amount that equals or exceeds a total daily amount permitted for systemic administration of fluconazole. The maximum recommended daily systemic dose for fluconazole is 400 mg/day. The fluconazole can be administered in combination with at least one antimicrobial agents, such as vancomycin and/or tobramycin.

As another example, the treatment process may locally administer at least one therapeutic that is an anesthetic or an analgesic that is administered to locally irrigate a treatment site to treat localized pain. The anesthetic can be lidocaine locally administered in a 24-hour period a total amount that equals or exceeds a total daily amount permitted for system administration of lidocaine. The maximum recommended daily system dose for lidocaine is 300 mg/day. The lidocaine can be administered in combination with another therapeutic as described elsewhere herein, such as with at least one antimicrobial agent.

The treatment delivery system 100 can be used for delivering treatment to any of a variety of treatment sites, such as an infected joint space. Where treatment sites are referred to herein as a joint space or another site, it should be appreciated that the treatment site or type of biological tissue being treated by controlled fluid irrigation can vary, including periprosthetic tissue, joint space, bone segment, bone fracture, of any number of bones, including bones of the hip, knee, shoulder, wrist, ankle, etc. The treatment site can be a wound area, including traumatic wounds, infected tissue, surgical incision, surgical site, osteomyelitis, septic arthritis, breast implant infection, fracture-related infection, and/or infected joints. Examples of treatments include periprosthetic joint infection treatment protocols, such as debridement, antibiotics and implant retention (DAIR) and exchange arthroplasty. Although the application may be described in the context of a particular treatment site (e.g., infected joints) and connection with that site, it should be appreciated that other treatment sites are considered and the way in which the system connects with those various sites may vary.

Where the treatment solutions being delivered using the systems described herein are described as an antibiotic, other fluids are considered as well, including any of a variety of irrigation fluids such as saline including irrigation fluids having one or more therapeutic capabilities including any of a variety of antimicrobials, including antibiotics, antivirals, antifungals, antiparasitics, and the like. Examples of antibiotics include aminoglycosides, glycopeptides, cyclic lipopeptides, amikacin, cefazolin, cefepime, ampicillin, ciprofloxacin, azithromycin, doxycycline, clindamycin, vancomycin, tobramycin, gentamicin, daptomycin, and combinations thereof. The treatment solutions being delivered using the systems described herein can include antifungals, alone or in combination with the antibiotic or combination of antibiotics. Examples of antifungals include azole derivatives (e.g., fluconazole, isavuconazole, Posaconazole), amphotericin B, echinocandins (e.g., anidulafungin, caspofungin, micafungin). The treatment solutions being delivered using the systems described herein can include pain medications, alone or in combination with the antibiotic or combination of antibiotics. Examples of pain medications include opioids, analgesics, anesthetics, and the like. Several classes of anesthetic and analgesics are appropriate for local irrigation of wounds, including: amino amides (e.g., lidocaine, bupivacaine, levobupivacaine, mepivacaine, ropivacaine, prilocaine), amino esters (e.g., benzocaine, chloroprocaine, procaine, tetracaine), NSAIDs (e.g., ketorolac, celecoxib, diclofenac, fenoprofen, indomethacin) and corticosteroids (e.g., prednisone, methylprednisolone, dexamethasone, triamcinolone, betamethasone, beclomethasone, flunisolide, fluticasone). The treatment solutions being delivered using the systems described herein can include a combination of antibiotics, for example, tobramycin sulfate and vancomycin HCl, and an anesthetic, such as lidocaine. The fluid being delivered using the treatment systems described herein can include a combination of antibiotics and an antifungal, such as fluconazole.

Referring to the example context of treating an infected joint, an example treatment protocol can include localized delivery of a first fluid from a first fluid reservoir to the treatment site, removal of the first fluid reservoir from the treatment site after a set soaking time corresponding to the first fluid soak period, localized delivery of a second fluid from a second fluid reservoir to the treatment site, and collection of the second fluid from the treatment site to a collection fluid canister after a set soaking time corresponding to the second fluid soak period.

Again with regard to FIG. 1A-1D, the treatment delivery system 100 can be attached to a support assembly 111. The support assembly 111 can include a pole 111A, a base 111B, legs 111C including lockable wheels 111D, and a power cord 111E. In some implementations, the height of the pole is fixed to ensure proper flow rate and fluid delivery performance. The height of the pole can be adjustable to enable elevation optimization of the treatment delivery system 100 and, in particular, the height of the fluid reservoir(s) 108A, 108B, relative to a height of the treatment site 102 to enable flow of the fluid from the fluid reservoir(s) 108A, 108B to the treatment site 102. Alternatively, the height of the pole can be fixed to ensure consistent performance of the treatment delivery system. The lockable wheels 111D of the support assembly 111 can be configured to enable the treatment delivery system 100 to be moved from one location to the next in a more convenient manner. For example, the lockable wheels 111D can be set in a release mode to enable the treatment delivery system 100 to be displaced to adjust a location of a the treatment delivery system 100 relative to the patient and to adjust a distance between the treatment delivery system 100 and the patient (e.g., treated site). The lockable wheels 111D of the support assembly 111 can be configured to enable the treatment delivery system 100 to be fixed at a particular location (setting the lockable wheels 111D in a locked state to prevent motion). In some implementations, the pole can conduct a portion of the power cord to the treatment delivery system 100 to enable (re)charge of the battery included in the control system 106. In some implementations, the system need not incorporate a support assembly with a pole and may be fully portable for use across different care settings such as a user carrying the device with a handle or other hand-held feature on the system.

Again with respect to FIGS. 1A-1D, the fluid delivery system 104A includes two or more fluid reservoir(s) 108A, 108B. The fluid delivery system 104A includes fluid delivery lines 110A, 110B (tubing), pinch valve(s) 120A, 120B, spike(s), connectors, and manual clamp(s). The fluid delivery lines 110A, 110B can be loaded on the control system 106 into normally closed pinch valve(s) 120A, B, which can be controlled to open and enable flow of set fluid types from the fluid delivery lines 110A, 110B, through the fluid delivery line 110C.

The fluid delivery system 104A includes fluid delivery lines 110A, 110B (tubes) for directing fluid from a selected fluid reservoir 108A, 108B during a respective phase of the treatment, through the fluid delivery line 110C to the treatment site 102 fluid delivery line. The fluid delivery lines 110A, 110B that transmit fluid from multiple fluid reservoir(s) 108A, 108B to the treatment site 102, which can incorporate a spacer 107 positioned within a joint space, can be loaded into the control system 106 through an entry port 112A, providing unobstructed access to fluid delivery lines 110A, 110B, if correctly attached to the pinch valves 120A, B. The pinch valves 120A, 120B (best shown in FIGS. 1C and 1D) can be covered by an openable door 112B (shown in FIG. 1B).

The openable door 112B can be opened to enable access to the pinch valves 120A, 120B to enable loading of the fluid delivery lines 110A, 110B within the pinch valves 120A, 120B. The openable door 112B, when closed allows the fluid delivery lines 110A, 110B to extend from outside the door 112B to the location of the pinch valves 120A, 120B without disrupting flow through the fluid delivery lines 110A, 110B when the door 112B is hinged to the closed position. In some implementations, the openable door 112B does not close until the fluid delivery lines 110A, 110B are installed properly in the pinch valves 120A, 120B. If the fluid delivery lines 110A, 110B are incorrectly loaded in the pinch valves 120A, 120B the closure of the door 112B is prevented. The fluid delivery system 104A can include at least two mechanical safety features: 1) pinch valves 120A, 120B size-matched with respective fluid delivery lines 110A, 110B such that a particular pinch valve 120A or 120B cannot receive a non-matching fluid delivery line 110B or 110A (and therefore, deliver an incorrect fluid during a particular phase); and 2) The openable door 112B cannot close if not installed properly.

Figure 1B:
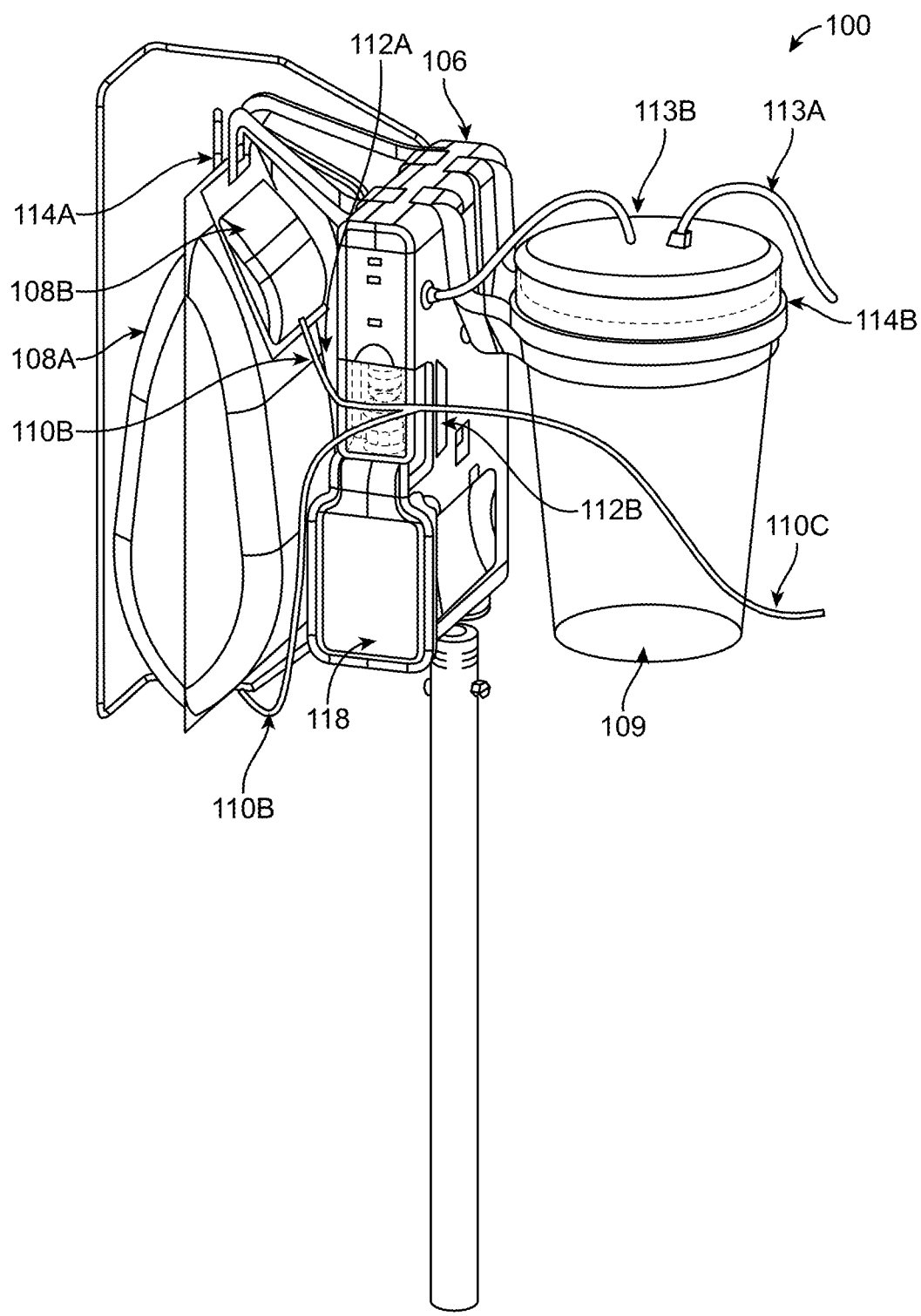
FIGS. 1B-1D show detailed views of the treatment delivery system of FIG. 1A.
Figure 1D:
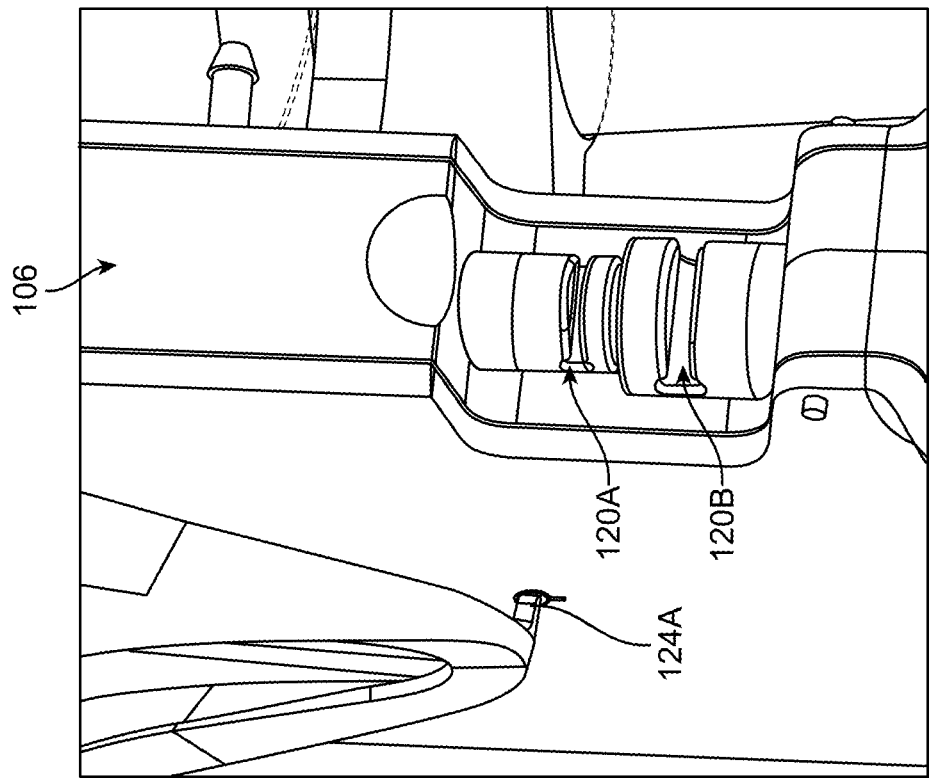
Figure 1C:
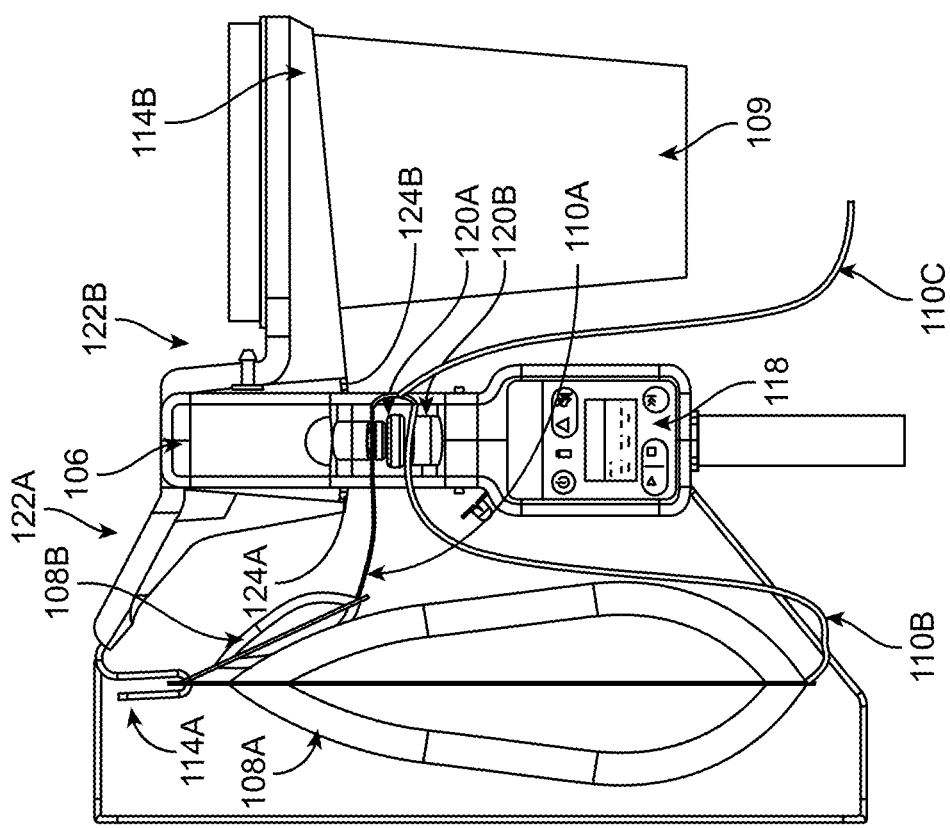

The fluid delivery system 104A can include additional safety features. For example, the pinch valves 120A, 120B can include one or more features that ensure a correct connection with the fluid delivery lines 110A, 110B. For example, the number of the pinch valves 120A, 120B can match the number of fluid reservoir(s) 108A, 108B and the number of the fluid delivery lines 110A, 110B. Each of the pinch valves 120A, 120B can have an identifier (e.g., color code, symbol marking, numerical identifier, barcode) within or near the entry ports to enable correct matching of the fluid delivery lines 110A, 110B, such that a first fluid delivery line 110A for fluid flow from the first fluid reservoir 108A is connected to a first pinch valve 120A and a second fluid delivery line 110B for fluid flow from the second fluid reservoir 108B is connected to a second pinch valve 120B. In some implementations, the vacuum lines 113A, 113B for directing fluid from fluid reservoir(s) 108A, 108B storing different types of fluids can have different geometries (circular cross-section, oval cross-section) and/or different sizes that match the geometry and size of respective pinch valves 120A, 120B. Even though FIGS. 1A and 1B illustrate two pinch valves 120A, 120B connecting to the vacuum lines 113A, 113B that direct fluid from two fluid reservoirs 108A, 108B, the treatment delivery system 100 can include more than two pinch valves 120A, 120B to enable controlled flow from more than two fluid reservoirs (e.g., two main fluid reservoirs and two back-up fluid reservoirs or for controlled flow from more than two fluid reservoirs storing fluids with different compositions and concentrations). More details about the fluid delivery system 104A are described with reference to FIG. 4.

The fluid delivery system 104A can deliver fluid to the treatment site 102 in a controlled manner, using the control system 106. The control system 106 can generate vacuum to induce a negative pressure at the treatment site 102 to optimize gravity-assisted delivery of a particular fluid (e.g., cleansing fluid, antimicrobial fluid, antibiotic irrigants, antifungals, or any other type of pharmacological fluid, including analgesics, or local anesthetics), with high precision, from a particular fluid reservoir 108A or 108B (e.g., solution bag) into the treatment site (e.g., periprosthetic space) 102 via fluid delivery lines 110A, 110B (e.g., fluid delivery lines) that are selectively and sequentially opened by respective pinch valves 120A, 120B. A desired set vacuum pressure within the system can be achieved prior to the initiation of treatment solution delivery during a "pre-delivery period," such as with a pump. The vacuum pump when turned on, can achieve and maintain vacuum pressure of the system for fluid removal from the treatment site. The vacuum pump and relief valve can achieve a secondary vacuum pressure, before turning off, in advance of fluid delivery. Residual vacuum pressure maintained within the system even after the pump is no longer running is leveraged during the delivery period(s) and aided by gravity-driven fluid delivery (i.e., head height of reservoirs) to draw treatment solutions toward the treatment site and/or remove fluid from the treatment site. For example, the pump can be turned on during the pre-delivery period to generate vacuum pressure within the system to a desired set-point. The pump can then be turned off and the treatment site exposed to the vacuum pressure within the system to cause flow of liquids through the system to and/or from the treatment site. The head height of the source container together with the residual vacuum maintained within the system delivers and/or removes the treatment solutions to and from the treatment site. The head height of the source containers can vary, but assuming a patient in the supine position may be at least 12 inches above the patient wound dressing. The delivery can be controlled by the control unit based on the load cell readings and also via activation of the pinch valves as opposed to the vacuum pump itself precisely controlling fluid flow and delivery to a patient. In other implementations, the vacuum pressure can be actively maintained within the system during the delivery period(s).

Each of the fluid reservoirs 108A, 108B can have a particular volume and store a particular fluid type that is delivered during a respective treatment phase. The first fluid reservoir 108A can store a first fluid that can include an antibiotic, such as tobramycin sulfate. The first fluid can be delivered from first fluid reservoir 108A to the treatment site 102 according to a respective fluid delivery protocol defining a volume of the first fluid to be delivered, a duration of fluid delivery, and pre-delivery vacuum that can be performed for a set vacuum time period (e.g., approximately 30 minutes) at a set pressure (e.g., −125 mmHg). The volume of first fluid to be delivered to the treatment site 102 can be set in a range between 6 mL and 500 mL, such as, 50 mL. In some implementations, approximately 80 mg of tobramycin sulfate in 50 mL of 0.9% sodium chloride are delivered in about 30 to 60 seconds and allowed to soak for a total of 2 hours in a single 24-hour period. The delivery of the first fluid volume can be controlled with an accuracy of ±approximately 5 mL to 10 mL. In some implementations, the delivery of first fluid is followed by a soaking protocol to enable the treatment site 102 to soak the delivered fluid. The duration of the first fluid soaking protocol can be between 1 and 3 hours, such as approximately 2 hours. The first fluid can be removed from the treatment site 102, by the fluid collection system 104B, before a second fluid is delivered to the treatment site 102. The duration of the first fluid removal from the treatment site 102 can be approximately 30 minutes.

The second fluid reservoir 108B can store a second fluid that can include an antibiotic, such as vancomycin hydrochloride. The volume of second fluid to be delivered to the treatment site 102 over at time period can be set in a range between 500 mL and 1500 mL, such as, 1200 mL. The total volume of the second fluid delivered can vary depending on the length of the time period as well as the total time for first fluid delivery, soak, and removal. For example, in a 24-hour time period where the first fluid delivery, soak, and removal was 2 hours, the time period of delivery of the second fluid can be approximately 22 hours. In some implementations, approximately 50 mL increments of 3000 mg vancomycin hydrochloride in 1200 mL of 0.9% sodium chloride are delivered in about 30 to 60 seconds and allowed to soak for a total of about 30 minutes. The number of 50 mL increments delivered can be about 20-23 in a single 24-hour period for a total of about 1000-1200 mL volume of the second fluid. The delivery of the second fluid volume can be controlled with an accuracy of ±approximately 5 mL. The delivery of second fluid is followed by a soaking protocol to enable the treatment site 102 to soak the delivered fluid. The duration of the second fluid soaking protocol can be between 15 and 45 minutes, such as approximately 30 minutes. The second fluid can be removed from the treatment site 102, by the fluid collection system 104B. The duration of the second fluid removal from the treatment site 102 can be approximately 30 minutes. In some implementations, multiple cycles of second fluid delivery, soaking, and removal are repeated before the first fluid is subsequently delivered to the treatment site 102. For example, the treatment protocol can be repeated over multiple (e.g., 7) days and during each day, the first fluid can be delivered once to soak the treatment area 102 and after the removal of the first fluid, multiple cycles of second fluid delivery, soaking, and removal can be repeated to complete a 24-hour treatment protocol. On Day 1, for example, the treatment site 102 and system can be prepped and a vacuum within the system established such as by a pump. Following seal checks and confirmations within the system, the first fluid can be delivered and allowed to soak as described above. After removal of the first fluid, the second fluid can be delivered, allowed to soak, and subsequently removed a plurality of times (e.g., 20-23 times) the remainder of day 1. At the start of day 2 (e.g., 24 hours after initiation of treatment), the canister and/or one or more reservoir bags can be changed and seal confirmed. A pretreatment vacuum cycle can commence prior to initiation of the first fluid delivery and soak. After removal of the first fluid, the second fluid can be delivered, allowed to soak, and subsequently removed a plurality of times (e.g., 20-23 times) the remainder of day 2. This daily protocol can be repeated for a period of up to about 7 days, up to about 10 days, up to about 14 days, or however long the treatment is desired.

The fluid collection system 104B can include vacuum lines 113A, 113B (tubes) for directing fluid from the treatment site 102 to a collection fluid canister 109 The control system 106 can generate a vacuum in the collection fluid canister 109 through the vacuum line 113B to remove the fluid from the treatment site 102 into the collection fluid canister 109 through the vacuum line 113A. For example, a pump can be activated by the control system 106 to create a vacuum within at least the collection fluid canister 109. The collection fluid canister 109 can include a single-use canister with a known volume (e.g., 2000 mL), such as, for example, Bemis Mfg. 2000-cc Hi-Flow Canister—Model No. 494410. The collection fluid canister 109 collects antibiotic solution or other fluids (e.g., wound exudate) accumulated during vacuum-induced drainage of fluid from the treatment site 102. The collection fluid canister 109 can include a hydrophobic bacterial filter and an overfill float valve. The collection fluid canister 109 can include a single-use canister that can be replaced at set times (e.g., daily) during the treatment and at the completion of the treatment. The large volume collection fluid canister 109 (e.g., about 2 L volume) may need only be emptied following a full 24-hour cycle of a treatment protocol. The material of the canister 109 is preferably translucent or transparent for a user to assess the level of the contents within the canister 109 during use. The material of the canister 109 is also preferably capable of retaining a vacuum without deforming or restricting flow at maximum vacuum level.

The control system 106 can control the irrigation (e.g., therapeutic fluid delivery and fluid removal) of multiple fluids (e.g., antibiotic solutions) according to a set protocol including multiple phases for delivery in a particular direction a particular fluid type for a set time duration, as described with reference to FIGS. 6 and 7. The settings of the control system 106 can be predetermined for a particular treatment type (e.g., the administration of vancomycin and tobramycin during a two-stage exchange arthroplasty procedure) according to one or more patient characteristics and/or treatment site characteristics (e.g., treated volume, treated location, wound type, geometry, size). In other words, the set protocol of the control system 106 to control the fluid delivery to a patient can be pre-programmed at a point of manufacturing and need not be programmed by a user at the time of use. A single actuation of a button on the system to initiate a treatment, for example, may be sufficient to initiate the set protocol, which in the case of multiple treatment solutions switches seamlessly between fluid sources (e.g., antibiotic solution bags) as the set protocol cycles through sequential deliveries and removals of the treatment solutions. In some implementations, the settings of the control system can be updated by the user (e.g., number of fluid solutions administered to the patient, treatment option A, B, or C, etc.).

The control system 106 can enable removable attachment of multiple fluid reservoir(s) 108A, 108B that can be attached to or supported by an attachment feature (e.g., hanger) 114A of the treatment delivery system 100. The control system 106 can enable removable attachment of the collection fluid canister 109 that can be attached to or supported by an attachment feature (e.g., ring) 114B of the treatment delivery system 100. The attachment features 114A, 114B can be configured to match a geometry and/or shape of at least a portion the fluid reservoir(s) 108A, 108B, and collection fluid canister 109, respectively, for secured removable attachment to ensure that the fluid reservoir(s) 108A, 108B, and collection fluid canister 109 are secured in position even during displacement (position adjustment) of the treatment delivery system 100.

The control system 106 can maintain vacuum pressure levels (e.g., −125 mmHg+/−10% or −112.5 mmHg to 137.5 mmHg) at particular, intermittent periods corresponding to respective treatment phases, to deliver fluid to the treatment site 102, to allow the fluid to soak at the treatment site, and to remove the fluid from the treatment site 102 into the collection fluid canister 109. The control system 106 can control fluid flow and vacuum pressure by using discrete logic components, processor/firmware, a pressure sensor, solenoid pinch valves, a vacuum pump, and a pneumatic solenoid valve 228, as described in detail with reference to FIGS. 2A-2F. As illustrated in FIG. 1B, the control system 106 can include a user interface 118. The user interface 118 can receive a user input for initiating a predetermined treatment cycle. In some implementations, the user interface 118 can receive a user input for an authorized user to select a treatment type and initiation of the treatment. In some implementations, the user interface 118 can receive a single user input to initiate treatment. The user interface 118 can be configured to include security features to prevent an unauthorized user from adjusting a therapy mode or device settings. In some implementations, the user interface 118 can be configured to generate an alert in response to the control system 106 detecting that one or more detected parameters is outside a set threshold to assist the user to ensure correct treatment execution. More details about the alarms generated by the user interface 118 are described with reference to FIGS. 5 and 6.

The fluid can be delivered to and removed from the treatment site 102, through a connection mechanism 116. The connection mechanism 116 can include one or more fluid connection ports to enable attachment of the fluid delivery lines 110C for delivery to the treatment site 102 and vacuum lines 113A for collection of the fluids from the treatment site 102 to allow irrigation of the treatment site 102 during corresponding treatment phases. In some implementations, the connection mechanism 116 can include a medical device that acts as a delivery component, such as an intramedullary stem, spacer, and/or any of a variety of components configured to distribute the treatment solution into the treatment site 102 including joint space and a surrounding intramedullary canal. The delivery component can, using pressure, such as steady pressure or a controlled pulsating pressure, such as a pulsatile lavage delivery, distribute the treatment solution.

Figure 2A:
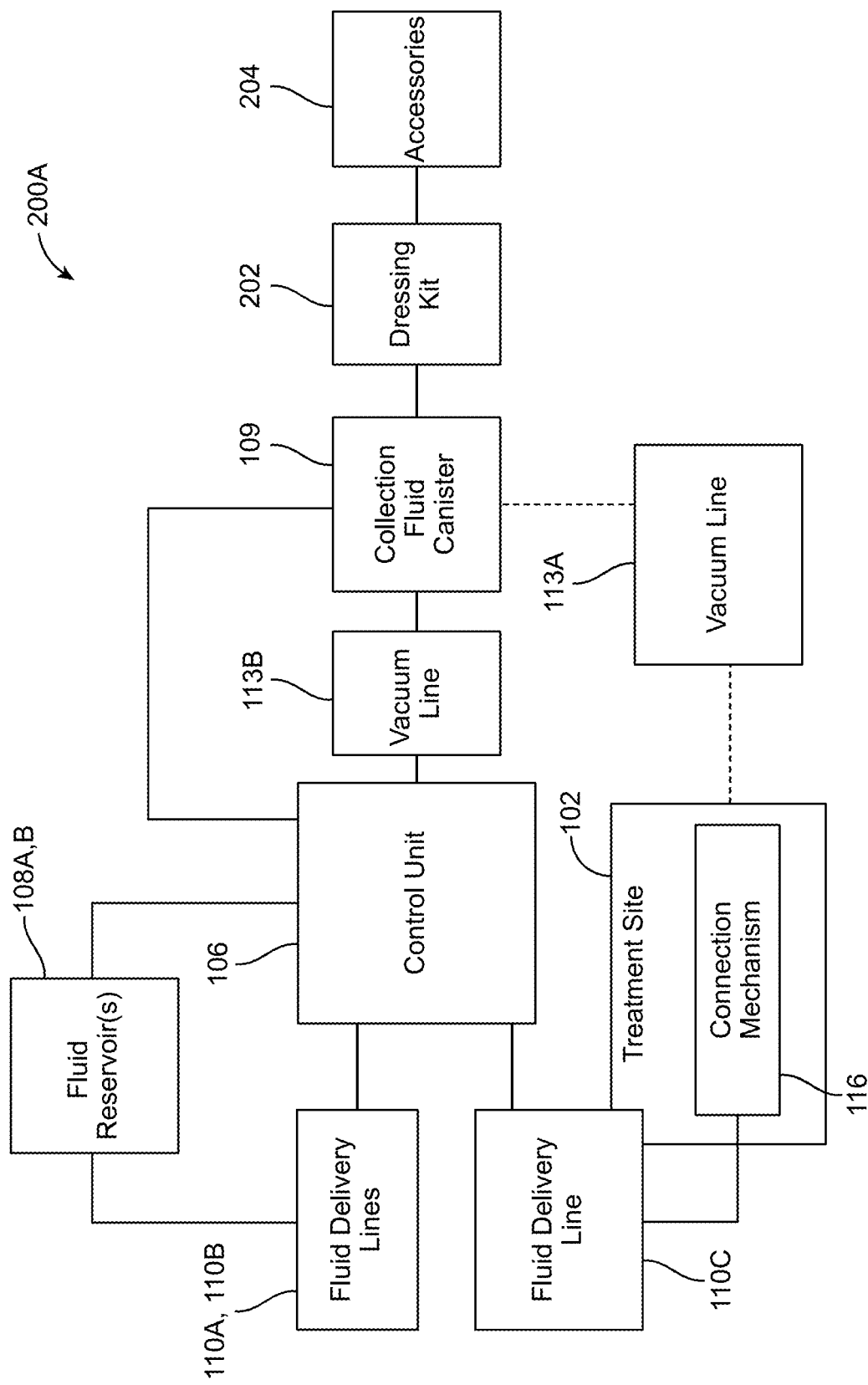

FIG. 2A illustrates an example block diagram 200A of the treatment delivery system 100 illustrating the connections between some components of the treatment delivery system 100, described with reference to FIGS. 1A-1D. The control system 106 can control fluid flow from the fluid reservoirs 108A, 108B through the fluid delivery lines 110A, 110B to the control system 106 and from the control system 106 through the fluid delivery line 110C to the treatment site 102. The fluid delivery lines 110A, 110B can be routed through their respective pinch valves 120A, 120B of the control system 106 to provide a fluid connection between the fluid reservoirs 108A, 108B and the control system 106.

The control system 106 can control fluid removal from the treatment site 102 to the collection fluid canister 109 through the vacuum line 113A, 113B. As illustrated in FIG. 2A, the control system 106 is connected to the fluid reservoirs 108A, 108B through the fluid delivery lines 110A, 110B and to the collection fluid canister 109 through the vacuum lines 113B (for fluid delivery) The control system 106 is also connected directly to the fluid reservoirs 108A, 108B through attachment feature 114A and directly to collection fluid canister 109 through attachment feature 114B (for monitoring the weight of the fluid reservoirs 108A, 108B and of the collection fluid canister 109, respectively throughout the treatment to enable verification of treatment progress. In some implementations, the control system 106 can include a pressure sensor to monitor pressure through one or more of the fluid delivery lines 110A, 110B, 110C, and one or more of the vacuum lines 113A, 113B. The pressure sensor, which can be located within the control unit on the PCB, can also be fluidly connected to the treatment site. The pressure sensor can measure pressure of the closed system, which includes the treatment site based on its being in fluid communication with the treatment site. The pressure sensor can be configured to generate a control signal that can be used by the control system 106 to adjust fluid flow to or from the treatment site 102.

The collection fluid canister 109 can include a designated inlet (patient) port 119 fluidly connected to the dressing kit 202 and one designated outlet (vacuum) port 121 fluidly connected to the control system 106. The ports 119, 121 of the collection fluid canister 109 can include fitted caps available to close off the ports when the ports are not in use (e.g., disposal of the collection fluid canister 109). In some implementations, the ports can be customized to fit with only a vacuum line tube connector or a control unity line tube connector to ensure appropriate assembly of the system.

The dressing kit 202 can be in fluid connection with both the collection fluid canister 109 and the treatment site 102. The dressing kit 202 can include a sterile, single-use kit, including an adhesive film drape, a high tensile strength foam, and tubing for fluid connection with the collection fluid canister 109 attached to the control system 106. For example, dressing kit 202 can be configured to enable the control system 106 to remove fluid from the treatment site and to deposit it in the collection fluid canister 109 by the application of vacuum, through the dressing kit 202. For example, the canister 109 can be a canister or the pump 226 can be activated to generate a vacuum within the canister 109 via vacuum line 113B coupled at port 121. The vacuum within the canister 109 can be applied to the treatment site 102 via the vacuum line 113A coupled at port 119 on a first end and the dressing kit 202 at a second end. The dressing kit 202 can include a commercial dressing kit indicated for negative pressure wound therapy to aid and promote healing of the treatment site 102.

The treatment site 102 can include a connection mechanism 116, such as a catheter and/or cannula that conducts the fluid transcutaneously to irrigation devices deployed within the treated area (e.g., infected tissue and/or infected joints, such as hip, knee, shoulder, wrist, ankle). In some implementations, an intra-articular end of the intramedullary stem can have a variable diameter to fit in a standard coupler receptacle of the connection mechanism 116. The connection component or spacer coupler of the connection mechanism 116 can include two parts, one connecting to the fluid delivery lines 110 and the other connecting to the dressing kit 202. Accessories 204 that assist in the application of the dressing kit 202 to a patient, for example, paste, gauze, alcohol swab sticks, and the like, can be provided with the system to improve seal reliability of the dressing kit 202.

FIG. 2B illustrates an example block diagram 200B of a portion of the components of the control system 106. The example block diagram 200B of the control system 106 includes at least one load cell 206, a filter 208, a load cell controller 210, a microcontroller (MCU) 212, a filter 214, and at least one pinch valve(s) 120A, 120B. Where the system is used to deliver more than a single treatment solution, more than a single pinch valve can be incorporated. A first pinch valve 120A can be engaged with and configured to control delivery of a first treatment solution through a first delivery line 110A and a second pinch valve 120B can be engaged with and configured to control delivery of a second treatment solution through a second delivery line 110B. The pinch valves 120A, 120B can selectively control delivery of the respective treatment solutions toward the treatment site. The system also preferably includes two load cells, a first load cell 206A configured to engage a component on the fluid delivery side of the system (see FIG. 2C) and a second load cell 206B configured to engage a component on the waste removal side of the system (see FIG. 2F), which are described in more detail herein.

The load cell 206 can be a weight sensor configured to measure a weight of a component acting on the load cell 206. For example, the load cell 206 can include strain gauge to monitor the mechanical load of a fluid reservoir containing a treatment solution that is arranged to abut against the load cell 206. The strain gauges can be electronically connected to a sensor capable of measuring the forces acting on the load cell 206. The sensor of the load cell 206 can output a signal that reflects the fluid level/weight of the corresponding fluid reservoir. The load cells 206 are described in more detail below regarding FIGS. 3A and 3B.

The filter 208 can include a band-pass filter with a frequency corresponding to the measurement frequency of the load cell to enable noise removal from the load cell output signal that reflects the fluid level, such that the transmitted fluid level is linearly decreasing or increasing during normal (leakage free and blockage free) operation of the treatment system.

The load cell controller 210 can control a load cell signal detection and filter frequency. For example, to extend battery lifetime, the load cell can operate on a 1-5 second duty cycle. The duty cycle can be adjusted to increase frequency of data collection during treatment or to further extend battery life.

The microcontroller (MCU) 212 can host the software that provides the logic which defines the system functionality during the treatment. The MCU 212 can include a control circuit configured to monitor the differential weight (e.g., change in fluid level). The weight can be used as an input, by the MCU 212 to control transition from one phase of the treatment to another (e.g., by closing a pinch valve and opening another pinch valve), to tell if there is a blockage of vacuum, and/or to determine if a fluid reservoir 108A, 108B is empty. The MCU 212 can serially connected to the load cell controller 210. The MCU 212 can include a filter 214. The filter 214 can include a soft filter configured to provide signal noise reduction using the knowledge obtained from set fluid level variation protocols corresponding to particular treatment types.

The pinch valve(s) 120A, 120B can be configured to open or close a respective fluid delivery line, thereby controlling delivery of a set volume of a particular fluid during a particular phase of the treatment. For example, the pinch valve(s) 120A, 120B can be controlled by a digital output generated by the MCU 212 to open and allow a particular fluid during a particular phase of the treatment to flow to the treatment site for a set period of time, after which the pinch valve(s) 120A, 120B can be controlled by the digital output generated by the MCU 212 to close and another pinch valve(s) 120A, 120B can be controlled by a digital output generated by the MCU 212 to open to allow another fluid during another phase of the treatment to flow to the treatment site.

FIG. 2C illustrates an example block diagram 200C of the control system 106, illustrating the connections between some components of the control system 106, described with reference to FIGS. 1A and 1B to monitor fluid delivery during different phases of the treatment. The example block diagram 200C of the control system 106 illustrates monitoring of the fluid delivery system 104A and fluid collection system 104B. The example block diagram 200C of the control system 106 includes a load cell 206A, the filter 208, the load cell controller 210, the MCU 212, and the soft filter 214, as described with reference to FIG. 2B.

Figure 2D:
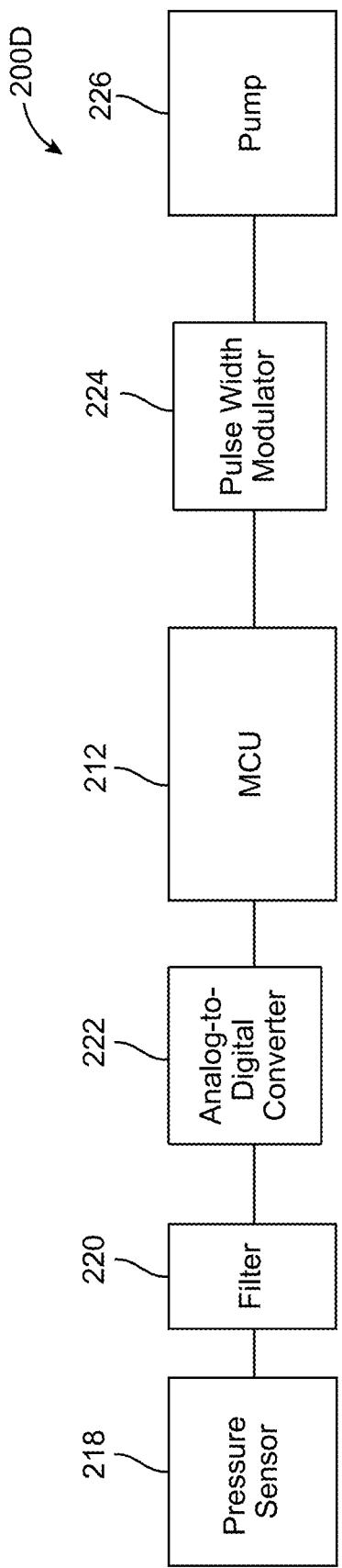
Figure 2E:
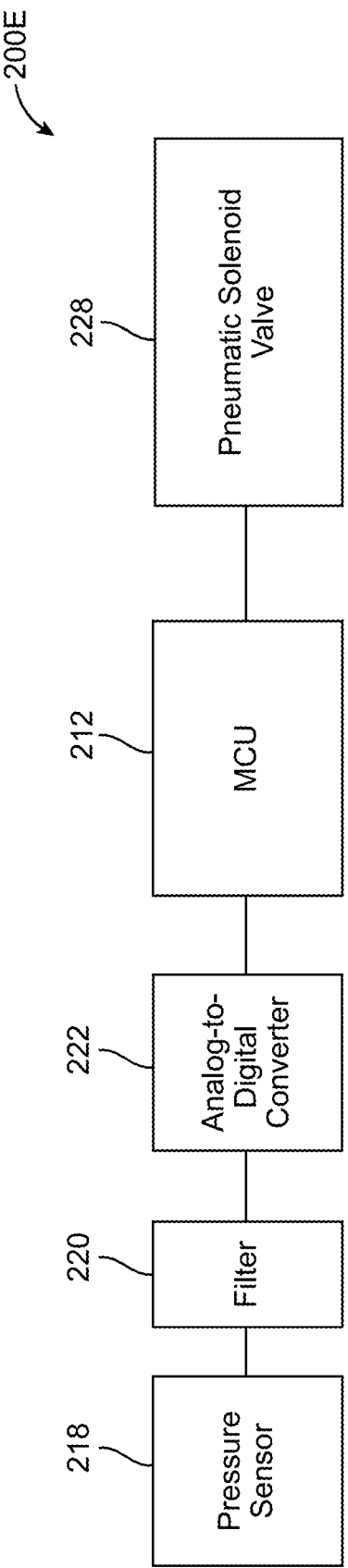

FIGS. 2D and 2E illustrate block diagrams 200D and 200E of examples of controlling, using the control system 106, the fluid delivery and the fluid removal systems during a treatment. The example of fluid control, illustrated in FIG. 2D, includes a pressure sensor 218, a filter 220, an analog to digital converter (ADC) 222, the MCU 212, a pulse width modulator 224, and a pump 226.

The pressure sensor 218 can be configured to send a control signal to the MCU 212 of the control unit (e.g., control system 106 described with reference to FIGS. 1A-1D) to adjust pressure at the treatment site 102 through the dressing kit 202. The pressure sensor 218 can be included in the control unit to monitor pressure of the vacuum-assisted fluid delivery to the treatment site 102 and the removed fluid during the fluid removal phase of the treatment. The pressure sensor 218 can be configured to generate an output including a pressure signal that can be filtered by the filter 220. The filtered analog pressure signal can be converted to a digital signal by the ADC 222. The ADC 222 can send a control signal to the MCU 212 of the control unit to adjust fluid flow by modifying a pump setting.

The MCU 212 can be configured to control the vacuum level delivery during fluid removal. For example, the MCU 212 can be configured to adjust the vacuum level for varying the flow rate of the collected fluid by controlling the pump 226, based on signals received from the pressure sensor 218. In some implementations, the control signal generated by the MCU 212 can be formatted, by the pulse width modulator 224, into discrete parts with a set pulse width to effectively control the pump 226.

The pump 226 can be configured to apply a vacuum pressure on the treatment site to draw fluid into the treatment site and to remove waste fluid from the treatment site during the fluid removal phase of the treatment. The pump 226 can include an electronically controlled peristaltic pump, venturi pump, a centrifugal pump, a diaphragm vacuum pump or any other type of suitable pump. The pump can be a reusable, durable pump. Alternatively, the pump 226 along with one or more other components of the system can be disposable. The entire control system 106 can be fully disposable and can be inoperable after a period of continuous use (e.g., 15 days).

The pump 226 can be configured to function at a predetermined set point (e.g., set pressure) defining the volumetric flow rate of the removed fluid. The pump 226 can be configured to run according to a plurality of settings. For example, at start-up, the pump 226 can run at a constant voltage (effectively corresponds to constant velocity). For example, the MCU 212 can monitor the voltage and turns the pump 226 on or off based on fixed voltage thresholds. As pressure (detected, at the fluid delivery line or fluid collection line, by the pressure sensor 218) increases and reaches a pressure threshold, MCU 212 can trigger the pump 226 to run at a constant torque. The constant torque phase of the pump 226 can be defined by constant current to slowly approach stall as the pressure detected by the pressure sensor 218 approaches a maximum absolute pressure (e.g., 125 mmHg). The selected current set point of the pump 226 can be adjusted to decrease the pump noise at a set speed.

The example of fluid collection system 104B, illustrated in FIG. 2E, includes a pressure sensor 218, a filter 220, an analog to digital converter (ADC) 222, the MCU 212, a pulse width modulator 224, and a valve 228. The valve 228 can include pneumatic valves (e.g., check valves), and (3-way universal) pneumatic solenoid valve(s). The valve 228 can control vacuum pressure in response to a digital signal generated by the MCU 212 in response to processing the pressure detected by the pressure sensor 218. For example, the valve 228 including a pneumatic solenoid valve can serve to relieve (e.g., exhaust to atmosphere) vacuum pressure as needed during the removal of the fluid from the treatment site.

Figure 2F:
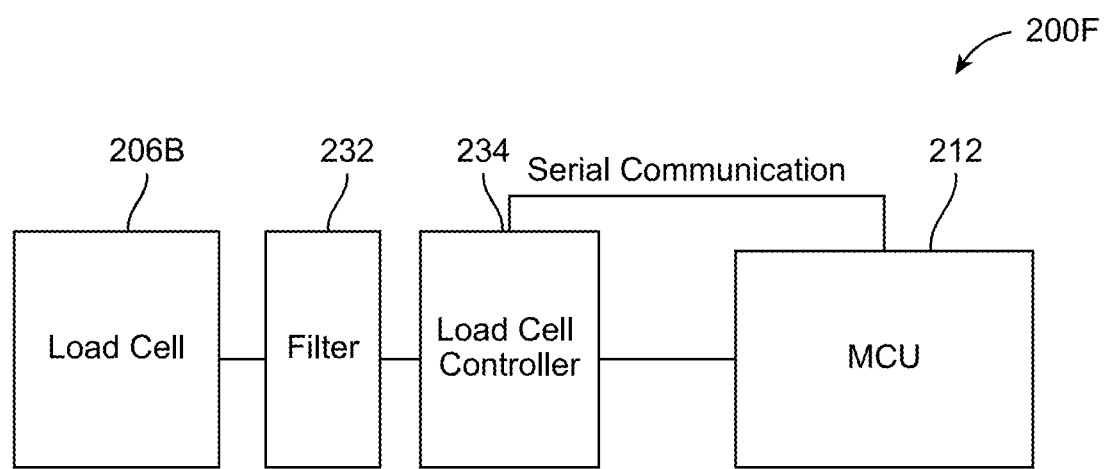

FIG. 2F illustrates a block diagram 200F of an example system for monitoring of a collection fluid canister illustrating the connections between some components of the fluid delivery system 104, described with reference to FIGS. 1A and 1B. The example system for monitoring of a collection fluid canister 109 includes a load cell 206B, a filter 232, a load cell controller 210, and the MCU 212. As will be described in more detail below, the load cell 206B is configured to be contacted by a portion of the component supporting the weight of the fluid collection canister 109.

The load cell 206B (similar to load cell 206A described with reference to FIGS. 2B and 2C) can generate an output a signal that reflects the fluid level/weight of the collection fluid canister 109 storing removed fluid. The filter 232 (similar to filter 208 described with reference to FIGS. 2B and 2C) can be configured to remove noise from the output signal of the load cell 206B. The load cell controller 234 (similar to load cell controller 210 described with reference to FIGS. 2B and 2C) can control a load cell signal detection and filter frequency. The MCU 212 can host the software that provides the logic which defines monitoring of the fill level of the collection fluid canister during fluid removal from the treatment site. The MCU 212 can include a control circuit configured to monitor the differential weight (e.g., change in fluid level). The MCU 212 can serially connected to the load cell controller 210. The treatment delivery system can include unique load cell and unique load cell controllers on each "side" of the system including the fluid delivery side and the fluid removal side.

Figure 3A:
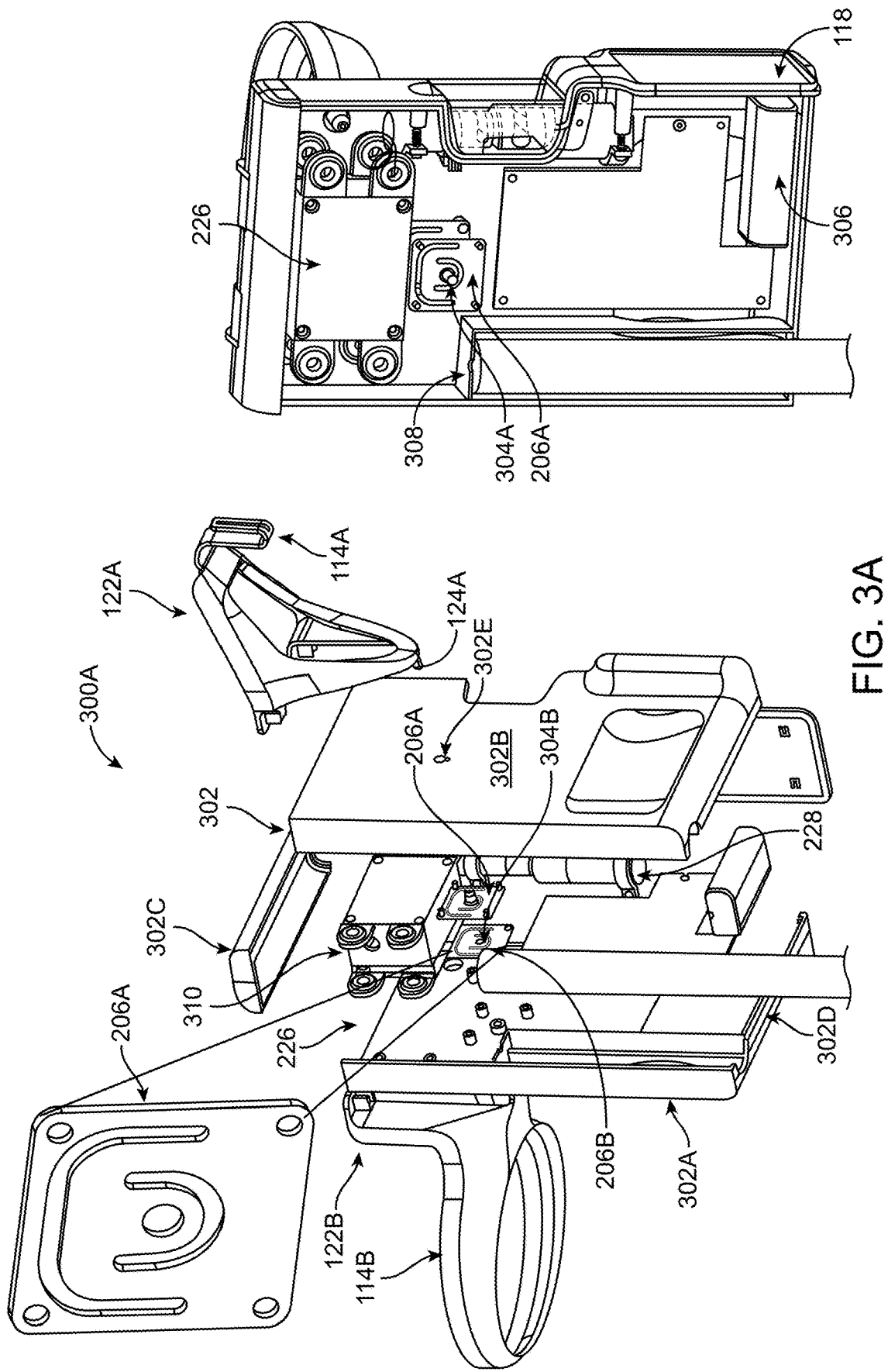
FIGS. 3A and 3B show exploded views of the example of the treatment delivery system, in accordance with some example implementations.
Figure 3B:
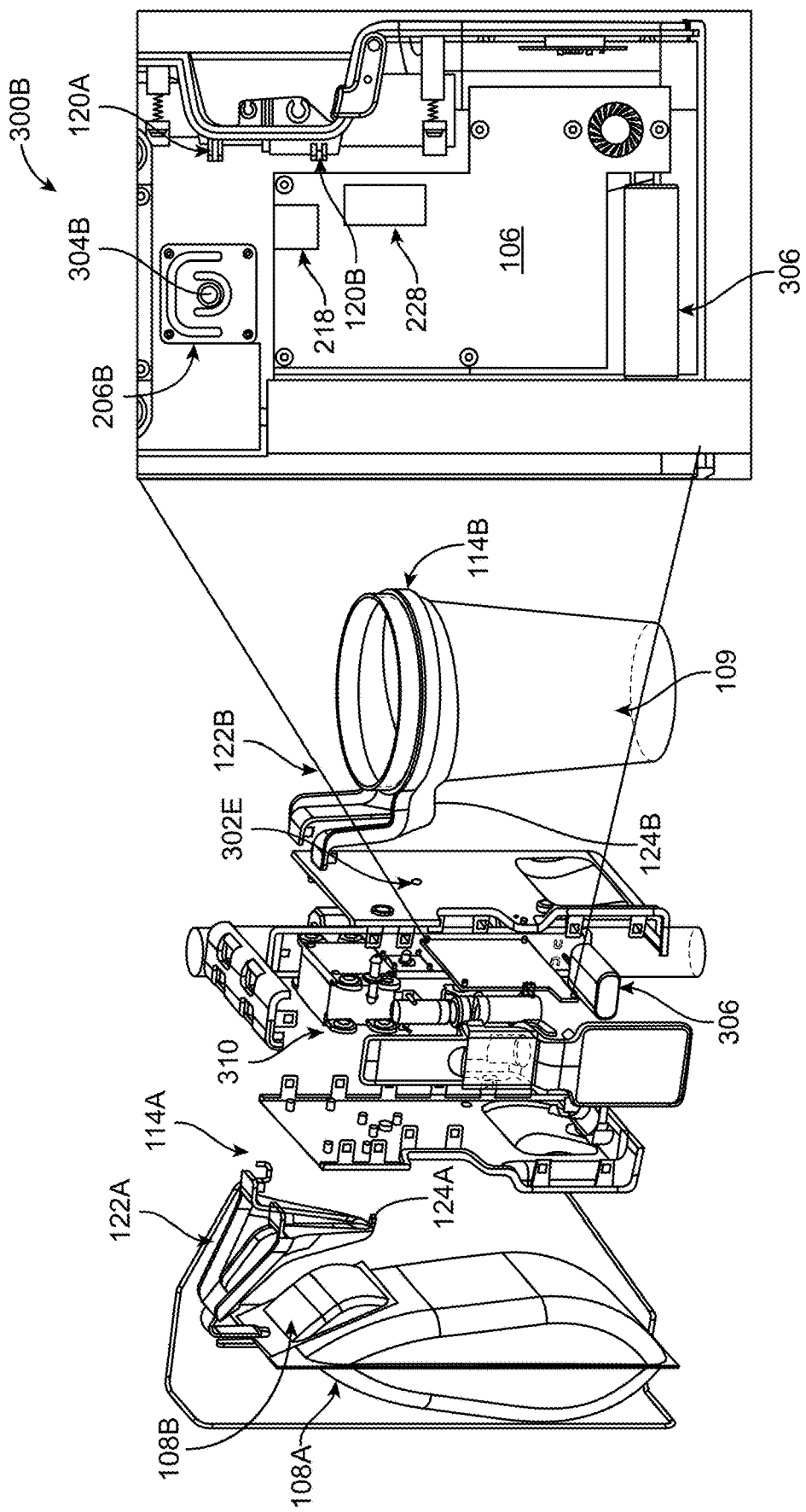

FIGS. 3A and 3B show exploded views 300A, 300B of the example of the treatment delivery system 100, in accordance with some example implementations. FIGS. 3A and 3B illustrate the components of the treatment delivery system 100, described with reference to FIGS. 1A and 1B with respect to their assembly position. The housing 302 of the treatment delivery system 100 can include multiple portions, such as side housing portions 302A, 302B, a top portion 302C and a bottom portion 302D. The housing 302 of the treatment delivery system 100 can be configured to support the attachment features 114A, 114B that enable attachment of the fluid reservoir(s).

The side housing portions 302A, 302B each can include an opening 302E sized to receive respective posts 304A, 304B of the load cells 206A, 206B (see FIGS. 3A-3B). A first opening 302E extends through side housing portion 302A and receives post 304A of load cell 206A. A second opening 302E extends through side housing portion 302B and receives post 304B of load cell 206B. The posts 304A, 304B in this implementation are arranged vertically or within a vertical plane of the system so that a force can be applied against the posts 304A, 304B by protrusions 124A, 124B horizontally or in a horizontal plane relative to the load cells 206A, 206B, which will be described in more detail below.

Still with respect to FIGS. 3A-3B, the fluid reservoir(s) 108A, 108B can be held by an attachment feature 114A on the fluid delivery side of the system and the fluid collection canister 109 can be held by a separate attachment feature 114B on the waste collection side of the system. The attachment feature 114A on the fluid delivery side can have any of a variety of shapes such as a hook, ring, or other feature. Preferably, the attachment feature 114A is a hook configured to hang one or more fluid reservoirs 108A, 108B similar to a hook for an IV bag system. Thus, each of the fluid reservoirs 108A, 108B can be a soft bag having a corresponding attachment at an upper end that is configured to be received by the attachment feature 114A. The attachment feature 114A can be configured to hold more than a single fluid reservoir, for example, at least a 50 mL solution container and a 1200 mL solution container. The canister 109 can be a container having a cylindrical shape and the attachment feature 114B can be a ring sized to receive the outer dimension of the cylinder. The attachment feature 114B can be configured to hold a container sized to contain at least 2000 mL. For example, the inner diameter of the upper end of the attachment feature 114B can be at least about 6 inches in order to rest against a lip of the canister 109 and prevent the canister 109 from sliding through the inner diameter of the attachment feature 114B. The attachment features 114A, 114B can each project a distance away from the centrally located control system 106 such that their respective containers can hang freely in a vertical orientation relative to the attachment features 114A, 144B without the fluid containers coming into contact with any other portion of the system.

The attachment features 114A, 114B each can be at an end region of respective protruding hanger beams 122A, 122B. The hanger beams 122A, 122B can each have protrusions 124A, 124B on an opposite end from the attachment features 114A, 114B. The protrusions 124A, 124B are arranged to engage the load cells 206A, 206B. For example, as the weight of the fluid reservoirs 108A, 108B hanging from the attachment feature 114A urges the attachment feature 114A in a downward direction, the protrusion 124A of the hanger beam 122A is urged horizontally against the post 304A of the load cell 206A. Similarly, as the weight of the fluid collection canister 109 resting within the ring of the attachment feature 114B urges the attachment feature 114B in a downward direction, the protrusion 124B of the hanger beam 122B is urged horizontally against the post 304B of the load cell 206B. Each of the load cells 206A, 206B can have a vertical orientation or are positioned within a vertical plane of the system so as to be contacted perpendicularly by the protrusions 124A, 124B of the respective hanger beams 122A, 122B creating the cantilever engagement. The cantilever engagement between each of the attachment features 114A, 114B and their respective load cells 206A, 206B is the pivoting of the hanger beams 122A, 122B where the force (generated by the weight of the fluid reservoirs and fluid collection canister) is being applied in a vertical direction against the respective attachment features 114A, 114B of the hanger beams 122A, 122B such that each of the load cells 206A, 206B is engaged in a horizontal direction by the protrusions 124A, 124B of the hanger beams 122A, 122B.

The configuration of the load cells 206A, 206B relative to their respective bags/canisters can vary as can the axis orientation of the reporting forces. The orientation can be as described above in which the load cells 206A, 206B are within a vertical plane and the force applied to them is within the horizontal plane. The load cells 206A, 206B can be within a horizontal plane and the force applied to them can be within the vertical plane. The load cells 206A, 206B may be positioned above their respective bags/canister to measure the weight of the bags/canister due to a tension force applied or may be positioned below their respective bags/canister to measure the weight of the bags/canister due to a compression force applied.

The interior of the treatment delivery system can include a battery 306 (e.g., rechargeable battery) to power the electronic components and an electrical connection 308. The interior of the treatment delivery system is designed to fit a pump enclosure 310 configured to provide noise reduction during operation of the pump 226. One or more valves such as a pneumatic solenoid valve 228 configured to regulate pressure during a corresponding treatment phase can be located inside the housing 302 As illustrated in magnified section of FIG. 3B, the pressure sensor 218 can be located inside in the housing 302 and coupled to the control system 106 to adjust fluid flow to or from the treatment site.

Figure 4:
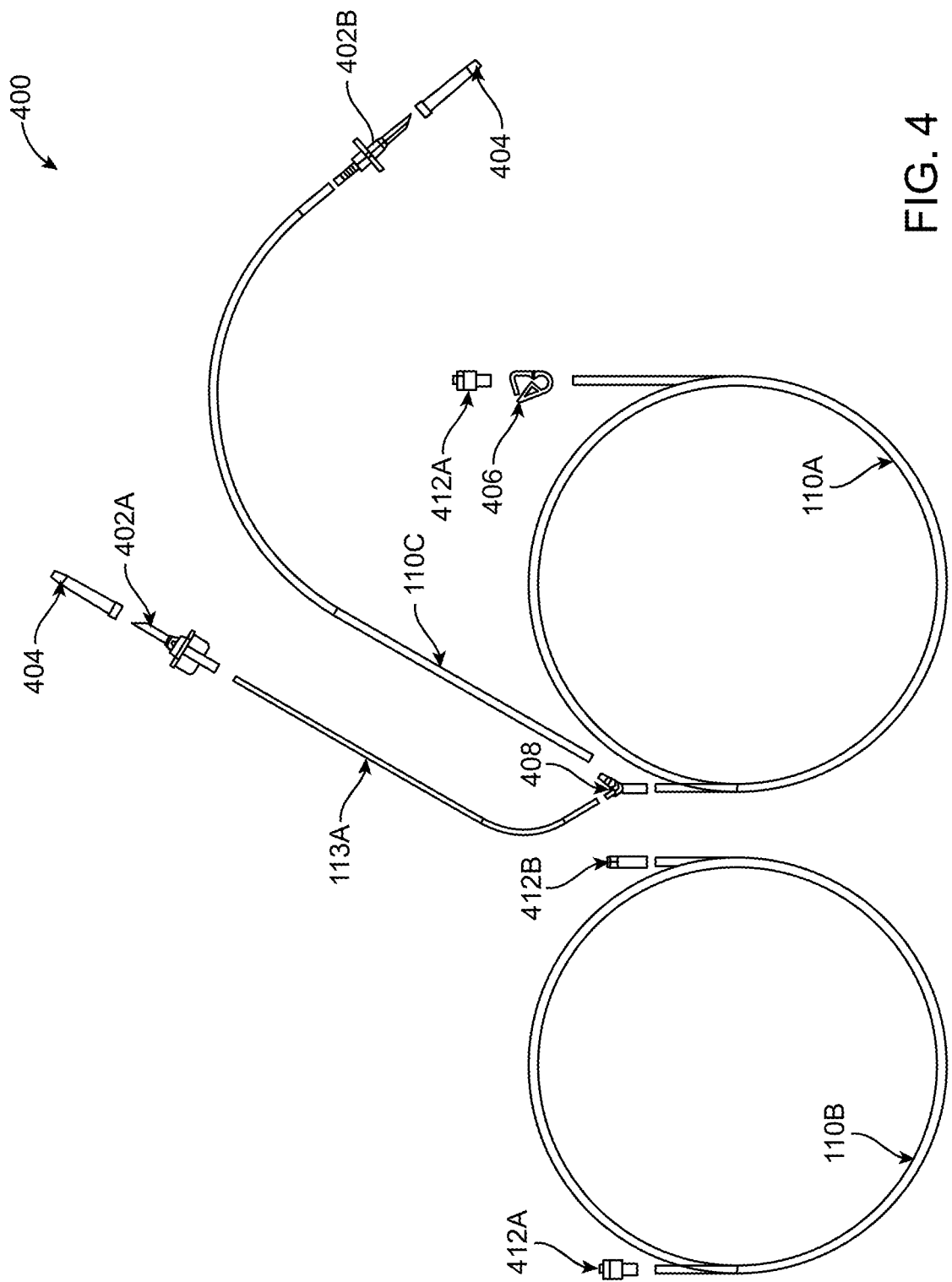
FIG. 4 shows a diagram of an example fluid delivery system of the treatment delivery system, in accordance with some example implementations.

FIG. 4 shows a schematic diagram 400 of the fluid delivery system 104A including fluid delivery lines 110A, 110B, 110C, vacuum line 113A connectors 402A, 402B, a cap 404, a clamp 406, a fluid delivery line connector 408, fluid delivery line and locks 412A, 412B. The connectors 402A, 402B can include spike to barb connectors. The connectors 402A, 402B can include fits of different dimensions to connect to fluid delivery lines with different diameters. For example, the spike-to-barb connector 402A can fit 1/16 inch inner diameter silicone tubing or equivalent and the spike-to-barb connector 402B can fit 1/8 inch inner diameter silicone tubing or equivalent. The cap 404 can include a spike cap. The fluid delivery lines 110A, 110B and vacuum lines 113A, 113B can include tubing of different dimensions. For example, fluid delivery line 110A can include a tube having 1/16 inch internal diameter and 1/8 inch outer diameter. The fluid delivery line 110B can include a tube having 1/8 inch internal diameter and 1/4 inch outer diameter. The multi fluid delivery line connector 408 can include a Y-connector. The multi fluid delivery line connector 408 can include a 1/16 inch barb, 1/8 inch barb, and 3/16 inch tubing port. The fluid delivery lines 110C can include tubing of different dimensions. For example, fluid delivery line 110C can include a tube having 3/32 inch internal diameter and 3/16 inch outer diameter and 72 inch length. The vacuum line 113A can include a tube having 3/32 inch internal diameter and 3/16 inch outer diameter and 36 inch length. The clamp 406 can be released by a user once the system is assembled and set up properly for treatment. The lock 412A can include a male luer lock. The lock 412A can include a tubing port fitting 3/16 outer diameter tubing. The lock 412B can include a female luer lock. The lock 412B can include a tubing port fitting 3/16 outer diameter tubing.

As discussed above, the system can include two normally closed pinch valves 120A, 120B that are activated to open for fluid delivery to the treatment site 102 and return to close when fluid delivery is stopped. A first pinch valve 120A, when in the open configuration, is sized to receive the outer diameter of the first fluid delivery line 110A, and a second pinch valve 120B, when in the open configuration, is sized to receive the outer diameter of the second fluid delivery line 110B. The inner dimension of pinch valve 120A can be sized differently than the inner dimension of pinch valve 120B when in the open configuration. Similarly, the outer diameter of the first fluid delivery line 110A can be different from the outer diameter of the second fluid delivery line 110B. This arrangement aids a user during installation of the fluid delivery lines into their respective pinch valves. As an example, the fluid delivery line 110A can be 1/8 inch outer diameter and the fluid delivery line 110B can be larger at about 1/4 inch outer diameter. The pinch valve 120A can be sized smaller than the inner dimension of pinch valve 120B and configured to receive an outer diameter of a fluid delivery line that is no greater than about 1/8 inch so that the fluid delivery line 110B cannot be practically installed within the pinch valve 120A. The pinch valves 120A, 120B can incorporate a mechanism configured to pinch closed the fluid delivery lines positioned within them and a mechanism to unpinch or open the valve while still loaded or attached with the fluid delivery lines. Thus, even when the pinch valves 120A, 120B are in the open configuration and not actively pinching the fluid delivery lines closed, the fluid delivery lines can be affixed within the inner dimension of their respective pinch valves 120A, 120B. The first fluid reservoir 108A can contain a first fluid (antibiotic) that is connected to a first fluid delivery line 110A sized to engage with a first pinch valve 120A during a first treatment phase. The second fluid reservoir 108B can contain a second fluid (antibiotic) that is different from the first fluid and is connected to a second fluid delivery line 110B sized to engage with a second pinch valve 120B during a second treatment phase, such that the first and second fluid can be sequentially delivered without mixing in the fluid delivery line 110C that guides the fluid to the treatment site 102. Each of the valves can be controlled to either open allowing flow through a respective fluid delivery line or close pinching off flow through the fluid delivery line. The first pinch valve 120A can be opened while the second pinch valve 120B is closed allowing flow only through the fluid delivery line 110A. The first pinch valve 120A can be closed while the second pinch valve 120B is opened allowing flow only through the fluid delivery line 110B.

Figure 5C:
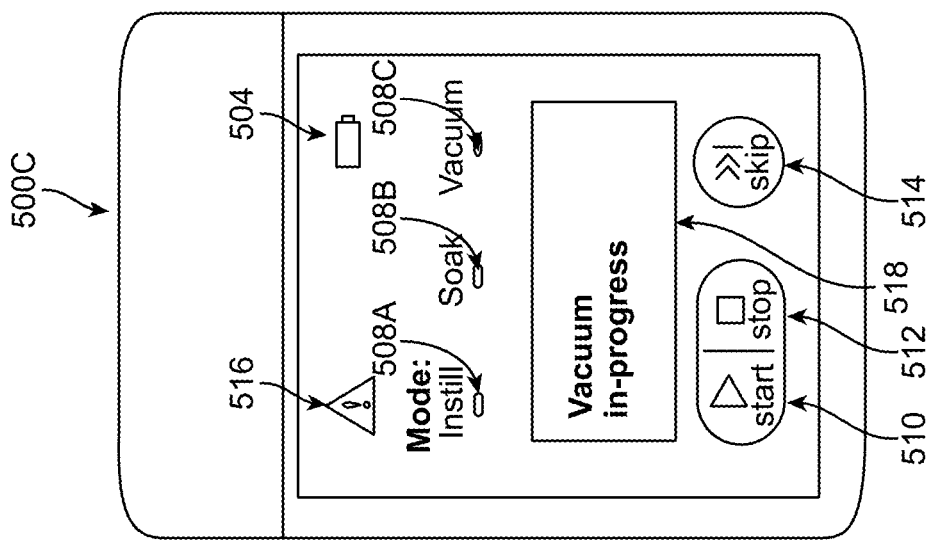
FIGS. 5A-5C show examples of user interfaces to control and monitor processes performed by the treatment delivery system, in accordance with some example implementations.
Figure 5B:
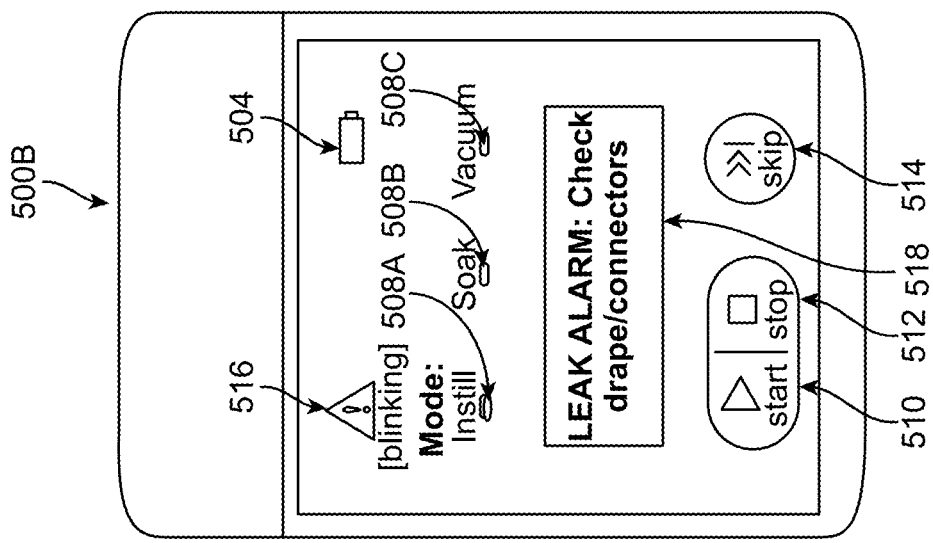
Figure 5A:
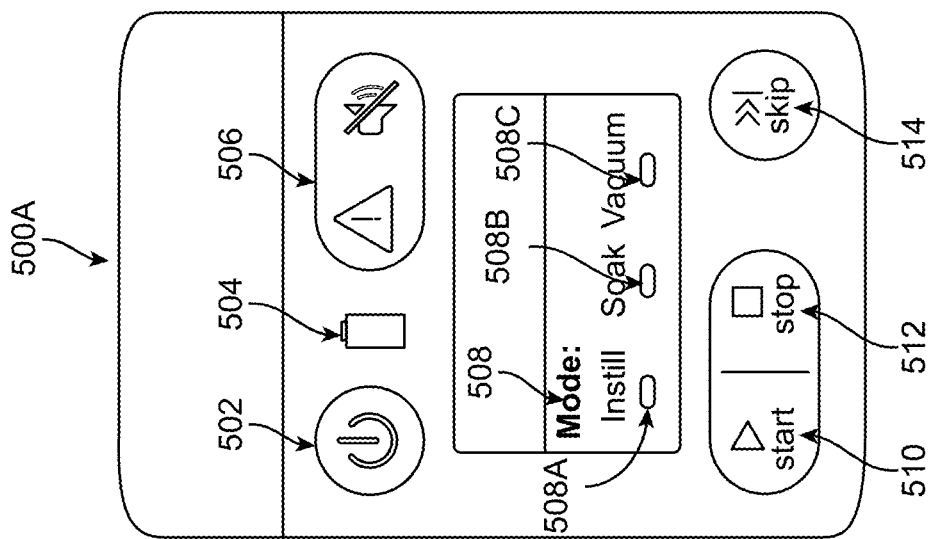

FIGS. 5A-C show examples of different displays 500A, 500B, 500C on the graphical user interfaces 118 to control and monitor processes performed by the treatment delivery system 100, in accordance with some example implementations. The examples of graphical user interface displays 500A, 500B, 500C can correspond to predetermined settings of a control unit control system 106 described with reference to FIGS. 1A-1D and FIGS. 2A-2F) to promote automatic and controlled treatment delivery. The graphical user interface 118 can include different outputs and inputs such as buttons to manage automatic and controlled treatment delivery. Where the term "button" is used it should be appreciated that alternative inputs are considered including sliders, dials, switches, keyboards, or other inputs including touchscreen virtual buttons.

FIG. 5A illustrates an example of a graphical user interface with an initial display 500A that enables receipt of a user input related to selection and initiation of a treatment. The example of a graphical user interface with an initial display 500A includes a power button 502, a battery charge level indicator 504, an alert sound mode indicator 506, a treatment mode 508, a start button 510, a stop button 512, a mute button, and a skip button 514. In response to receiving a user input to power off the control system 106, the power button 502 is held, and then a vacuum occurs to remove any fluid that might be left in the treatment site. The treatment mode 508 can include multiple phases 508A, 508B, 508C that can be displayed in an order of scheduled execution. The battery charge level indicator 504 can have an icon (e.g., a schematic representation of a battery) that is colored or shaded over time. In some implementations, the battery indicator is green when the battery is full, flashing green when the battery is charging, and red when the battery is low (e.g., <20% capacity). The amount of the shape that is colored or shaded (e.g., the fill amount) can be proportional to the battery charge level. For example, when the battery is full, the entire battery charge level indicator 504 may be filled. As the battery charge level decreases, the amount of fill lessens. When the battery charge level decreases below acceptable limits, the battery charge level indicator 504 can include a visual alert of the critically low battery life time. The visual alert of the battery charge level can include periodic flashes of light and change display color of battery icon from green to red.

FIG. 5B illustrates an example of a graphical user interface display 500B providing an alert that enables a user to modify at least a portion of the treatment delivery system (e.g., treatment delivery system 100 described with reference to FIGS. 1A and B) to ensure correct delivery of the treatment. The example of a graphical user interface 500B includes the battery charge level indicator 504, the start button 510, the stop button 512, the skip button 514, an alert icon 516, a mute button, and a display 518 for providing textual alerts. The alert icon 516 can include visual indicator, such as a static or flashing color or an applied highlighting that can be modified to indicate when a value of pressure, fluid volume stored in a reservoir, and/or flow rate is outside of a set range.

In the illustrated example of FIG. 5B a leak alarm is shown on a display 518. The leak alarm can be shown by the alert icon 516 and/or the textual alert indicator provided on the display 518, if the system has not reached the target vacuum pressure setting, a significant vacuum pressure leak has been detected in the system. The alert icon 516 may include a red flashing highlight indicating that a leak is detected and the display 518 can provide an instruction for a user to correct the detected error that triggered the alert. As another example, the alert icon 516 and the display 518 can display an alert if a fluid reservoir (e.g., an antibiotic solution bags) does not have a weight within a set range (e.g., is not installed or is empty) or a collecting fluid canister does not have a weight within a set range (e.g., is not attached or is full). As another example, the alert icon 516 and the display 518 can display an alert if battery charge level is below a set threshold, a vacuum blockage is detected by the pressure sensor(s), one or more portions of the treatment delivery system are incorrectly assembled, and/or movement of the system (i.e., control unit device) is above a set threshold during fluid delivery phase(s).

FIG. 5C illustrates an example of a graphical user interface display 500C that provides updates related to a progression of a treatment. The example of a graphical user interface 500C includes the battery charge level indicator 504, the start button 510, the stop button 512, the skip button 514, and a display 518 for providing textual alerts. The display 518 can include a text describing a phase or mode of the treatment (e.g., "vacuum in progress"). The display 518 can match a highlight added to the display of treatment phases 508A, 508B, 508C to indicate the phase of the treatment that is being performed by the system.

The buttons or inputs of the graphical user interface can vary and the above are just examples of some combinations of inputs. The user interface can include in some implementations a power button, a mute button, a start button, a stop button, and a skip button. The power button can be used to power on and power off the control unit of the system. As an example, the power button can be pressed once for a relatively short time to turn the control unit on and the power button can be pressed and held for a longer time to turn the control unit off. The mute button can be used to silence, temporarily or permanently, an alert and/or alarm of the system. For example, the mute button can temporarily mut the audible indicator associated with an active alarm, such as a medium priority alarm that will resume or turn back on if the state remains even if muted. The mute button can silence the alarm for a reasonable period, such as after 30 minutes if the state remains active after a user presses the mute button. The start button can be used to initiate a treatment process. The start button can be used to start the therapy and used to deactivate alarms after resolving an issue to continue a therapy already initiated. The skip button can be used in combination with the start button to select a desired treatment process. The skip button can be used to scroll through different process and the start button can be used to select a desired process. For example, a day of treatment can be selected using the start and skip buttons. Day zero, the first cycle initiated starts a seal confirmation test, if assembled properly. Days one through six, the subsequent cycles initiated starting the pre-treatment vacuum cycle, if assembled properly. The skip button can also be used to skip a particular phase of a cycle, such as a tobramycin soak cycle. The stop button can be used to terminate a treatment process. The system need not include a stop button on the user interface and instead can include a reset button. The reset button can cause the control unit to revert back to a home screen, such as a start therapy screen.

Figure 6:
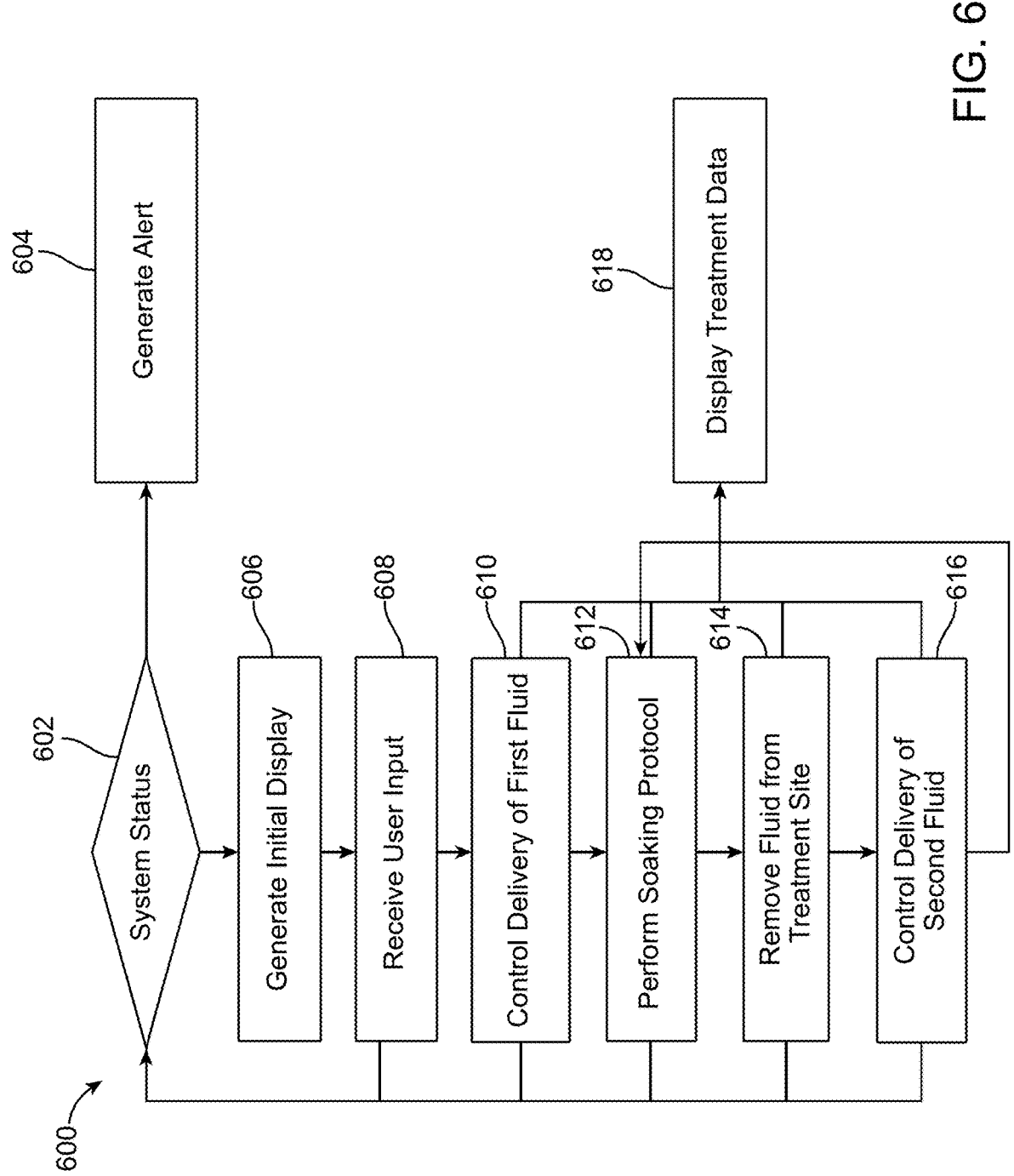
FIG. 6 shows an example of a process performed by the treatment delivery system, in accordance with some example implementations.

FIG. 6 depicts a flowchart illustrating an example of a process 600 performed by a treatment delivery system (e.g., treatment delivery system 100 described with reference to FIGS. 1A-1D, 2A-2F, 3A and 3B), in accordance with some example implementations. The example process 600 can include local irrigation for treatment of chronic periprosthetic joint infection in skeletally mature patients undergoing a two-stage revision arthroplasty procedure, where multiple (antibiotic) fluids (e.g., vancomycin HCl and tobramycin sulfate) are delivered during separate phases of the treatment of the infection. For example, during a first stage of the treatment, the infected prosthesis can be removed surgically, debrided, and the temporary spacer implanted. The combination treatment can be performed over a seven-day period alternating tobramycin and vancomycin via the temporary spacer. During a second stage of the treatment, the temporary spacer is explanted, debrided, and a permanent prosthesis implanted followed by systemic administration of postoperative fluids (antibiotics), according to the example process 600. The combination treatment can also be performed without removing the infected prosthesis.

The treatment delivery system can be coupled to the treatment site as described elsewhere herein and a user can initiate a treatment cycle such as by pressing 'Start'. The pump turns on to generate a vacuum pressure at a wound site during a 'Drawdown Period' until a set vacuum pressure is achieved. The treatment delivery system then performs a series of checks and confirmations of the status before initiation of treatment phases during the 'Seal Confirmation" period. Upon completion of a 'Seal Confirmation' period, the system transitions to a 'Pre-Treatment Vacuum Cycle,' to confirm the set vacuum pressure achieved during the 'Seal Confirmation' period can be maintained.

The user can assemble the system components (e.g., hangers, solution bags, canister, tubing, etc.) and makes the appropriate connections between the system components and the treatment site. The treatment delivery system can be powered on with a power button or by plugging the device into a wall outlet. Upon powering up the treatment delivery system, the status of the treatment delivery system is verified. At 602, a status of the treatment delivery system is verified before the treatment phases are initiated and during each of the treatment phases. Verifying the status of the treatment delivery system can include measurement of system parameters using multiple sensors, such as pressure and weight sensors, as described with reference to FIGS. 1A-1D, 2A-2F, and 3A-3B. Each of the system parameters is compared to a respective safety range and/or threshold. Verifying the status of the treatment delivery system can be adjusted based on a treatment type (e.g., infection therapy type) for which the treatment delivery system was configured to execute.

At 604, if one or more system parameters is outside a respective safety range, an alert/alarm is generated. The alert/alarm can include a visual and/or audio alert. The visual alert can be displayed by a graphical user interface, as described with reference to FIG. 5B. The alert can include a leak alarm, a vacuum blockage alarm, a full collecting fluid canister alarm, an empty bag alarm, a fluid delivery blockage alarm, a low battery alarm, an incorrect assembly alert, and/or an excessive motion alert.

The leak alarm can appear when the system has not reached the target vacuum pressure setting or a significant vacuum pressure leak has been detected in the system, potentially compromising therapeutic benefits. The leak alarm can be activated (e.g., transitions from OFF to ON) if (i) device does not achieve set point vacuum pressure of 125 mmHg±10% (112.5 to 137.5 mmHg) at treatment site in a set time period (e.g., 2.5 minutes) or (ii) after the set time period, vacuum pressure falls below a pressure threshold (e.g., −112.5 mmHg) for longer than a set time (e.g., 60 s) during a fluid removal phase.

The vacuum blockage alarm can appear when the vacuum line has a blockage (e.g., blockage in vacuum line, kink, crimped, >50% blocked tubing). The vacuum blockage alarm can be activated (e.g., transitions from OFF to ON) at the end of a fluid removal phase, if the removed fluid volume is below a set fluid volume threshold. For example, if the fluid volume collected in the collecting fluid canister at completion of a single fluid removal phase of a set duration (e.g., 30 minutes) is below a set fluid volume threshold (e.g., less than 25 cc fluid).

The full canister alarm can appear when the fluid volume collected in the collecting fluid canister during the fluid removal phase exceeds a threshold (e.g., greater than 90% of collecting fluid canister capacity). The vacuum blockage alarm and the full canister alarm can activate a user instruction alert (e.g., fluid delivery blockage) including a textual description of recommended user action.

The empty bag alarm can be triggered if a weight of any of the fluid reservoirs is below a minimum weight, preventing the treatment delivery system from being powered to execute the treatment. The empty bag alarm can be activated during the treatment, if the fluid volume (derived from the measured fluid weight detected by a respective load cell) in a fluid reservoir (e.g., antibiotic solution bag) is not sufficient (e.g., is below a minimum fluid volume threshold) to complete a fluid delivery phase. The empty bag alarm can activate a user instruction alert (e.g., replace empty bag with full bag) including a textual description of recommended user action.

The fluid delivery blockage alarm can appear when the treatment delivery system delivers less than a set fluid volume threshold (e.g., 45 mL) into the treatment site in a set time period (e.g., 5 minutes) from the start of fluid delivery activation (e.g., transition from OFF to ON). For example, the fluid delivery alarm can be activated if the delivery of a particular fluid (e.g., vancomycin hydrochloride solution) during its corresponding phase results in less than a set volume (e.g., 30 mL) in a set time period (e.g., 5 minutes before the end of the corresponding fluid delivery phase).

The low battery alarm can appear when the charge level (lifetime) of a battery of the treatment delivery system is below a minimum charge level threshold (e.g., 20% battery capacity) recommended to complete the treatment and the treatment delivery system is not connected to an external power source (e.g., plugged into wall power). The incorrect assembly alert can alert a user if any of the fluid reservoirs (e.g., antibiotic bags) is incorrectly attached to the treatment delivery system prior to initiation of any treatment phase, to ensure correct delivery of a particular fluid type during a particular treatment phase. The incorrect assembly alert can activate (e.g., transition from OFF to ON) if (i) during a 'seal confirmation,' the device measures the collection fluid canister weight outside a weight range (e.g., greater than 1.5 kg), (ii) during a 'pre-delivery period,' the device does not measure a fluid reservoir weight. In some implementations, the first fluid reservoir weight does not intersect with the second fluid reservoir weight to ensure that the two fluid types can be automatically determined and differentiated.

The excessive motion alert can alert a user if the system (i.e., Control Unit) motion exceeds a motion threshold required for accurate dosage during treatment. The dosage is determined based on weight of the respective fluid reservoir or collection fluid canister, which are determined by the load cells based on an interaction with the attachment features supporting the respective fluid reservoir or collection fluid canister, such that system motion (e.g., during transportation of the system) can modify the interaction with the load cell, leading to dosage estimation errors. The excessive motion alert can be used to stabilize the fluid delivery system for fluid delivery. The control unit can automatically pause prior to, or during a fluid delivery phase, if an excessive motion alert is generated by a measurement of a differential antibiotic solution weight (e.g., ±20%) exceeding a set tolerance threshold prior to, or during a fluid delivery phase. The excessive motion alert can be a control function of the control unit during instillation to maintain accuracy during transportation. However, the system need not incorporate an excessive motion alert.

At 606, if the system parameters are within safety ranges (no alert is generated), an initial display is generated, as described with reference to FIG. 5A. The initial display can be generated to be displayed by a graphical user interface of a control unit to enable receipt of a user input.

At 608, a user input is received. The user input can include a selection of an activation of a start selector (e.g., start button) to initiate an automatic treatment delivery including multiple phases. The system automatically transitions into the treatment phases after the initial "start" is pressed and all system checks are passed. The treatment phases can include fluid delivery of multiple fluids in alternating fashion to a treatment site, controlled fluid soaking phases, and removal of fluid from the treatment site prior to delivery of the next fluid.

At 610, delivery of first fluid to a treatment site is controlled by the system. The delivery of the first fluid can be provided by vacuum pressure within the system and assisted by gravity due to head height of the reservoir container holding the first fluid. The treatment delivery system following the start-up protocol can include time period to confirm the vacuum pressure within the system and a pre-delivery period after achieving the set vacuum pressure before automatically initiating delivery of first fluid to the treatment site. The delivery of the first fluid can be from the first fluid reservoir (e.g., first antibiotic solution bag), through the fluid delivery line loaded in and extending through a first pinch valve controlled by the system, to the treatment site. The delivery of the first fluid to the treatment site can be controlled by a control unit of the system that selectively activates (opens) the first pinch valve to allow the first fluid to flow from the first fluid reservoir to the treatment site. As discussed elsewhere herein, the system can further incorporate a second fluid reservoir of a second fluid for delivery to the treatment site through a second fluid delivery line that extends through a second pinch valve. The first fluid is delivered through the first fluid delivery line to the treatment site while flow of the second fluid through the second fluid delivery line is blocked by the second pinch valve remaining closed. During delivery of the first fluid, a control circuit can monitor the differential weight (e.g., change in fluid level) of the first fluid reservoir to select a timing to open or close the first pinch valve on the first fluid delivery line, thereby dispensing a fixed volume of first fluid. The first fluid can include an antibiotic, such as tobramycin sulfate, from the first reservoir bag. The volume of first fluid to be delivered to the treatment site can be set in a range between 6 mL and 500 mL depending on the time period of the treatment, such as, 50 mL for a single 2-hour treatment period or up to about 500 mL for multiple treatment periods over course of about 7 days. The delivery of the first fluid volume can be controlled with an accuracy of ±approximately 5 mL. In some implementations, approximately 50 mL tobramycin sulfate are delivered in about 30 seconds.

After completion of the delivery phase of first fluid a soaking protocol follows that enables the treatment site to soak in the delivered first fluid. The vacuum pressure within the system can be deactivated and vented to atmospheric pressure during soaking. At 612, a soaking protocol of the first fluid at the treatment site is performed. The control unit of the treatment delivery system can be configured to allow the delivered fluids to soak the treatment site (e.g., periprosthetic space) for a predetermined dwell time. In some implementations, the soaking protocol is activated after delivery of each fluid and before the delivery of the following fluid. The duration of the soaking phase can be set depending on the fluid type of the delivered fluid. For example, the duration of the soaking phase can be set to be approximately 2 hours after delivery of tobramycin sulfate solution and approximately 30 minutes after delivery of vancomycin hydrochloride solution.

At 614, fluid (e.g., including the first fluid and any other fluids such as wound exudate from the treatment site) is removed from the treatment site. The control unit of the treatment delivery system can remove the fluid from the treatment site and deposit the collected fluid in a collecting fluid reservoir (e.g., canister) by the application of vacuum, through a dressing kit, as described with reference to FIG. 2A. For example, vacuum pressure is generated within the system by activating the pump until a set vacuum pressure is achieved and maintained. The control unit can maintain vacuum pressure levels, such as, for example, −125 mmHg±10% (−112.5 to 127.5 mmHg) for set, intermittent periods to remove the fluid from the site of infection into the collecting fluid canister, through the dressing kit. The vacuum pressure level can be controlled by the control unit using a pressure sensor, a vacuum pump, and a pneumatic solenoid valve, as described with reference to FIGS. 2A-2F. A sensor can generate an output as a voltage to reflect the vacuum level applied by the treatment delivery system. The control unit can monitor the sensor's voltage and turn the pump on or off based on fixed voltage thresholds. The pneumatic solenoid valve can be activated by the control unit to adjust vacuum pressure by relieving (i.e., exhausting to atmosphere) vacuum pressure, as needed to maintain the vacuum pressure within a set pressure range. The duration of the fluid removal phase can be set depending on the fluid type collected at the treatment site. For example, the duration of the fluid removal phase can be set to be approximately 30 minutes.

At 616, delivery of second fluid to the treatment site is controlled by the system. The delivery of the second fluid can be provided by vacuum pressure within the system that can be assisted by gravity due to head height of the reservoir container holding the second fluid. The treatment delivery system achieves and maintains a set vacuum pressure during a pre-delivery period before automatically initiating delivery of the second fluid to the treatment site. The delivery of the second fluid can be from the second fluid reservoir (e.g., second antibiotic solution bag) into the fluid delivery line loaded in and extending through the second pinch valve controlled by the system. The delivery of the second fluid to the treatment site can be controlled by the control unit of the system that selectively activates (opens) the second pinch valve to allow the second fluid to flow from the second fluid reservoir to the treatment site while blocking the flow of the first fluid through the fluid delivery line, by maintaining the first pinch valve in a closed configuration. During delivery of the second fluid, a control circuit can monitor the differential weight (e.g., change in fluid level) of the second fluid reservoir to select a timing to open or close the second pinch valve on the second fluid delivery line, thereby dispensing a fixed volume of second fluid. The second fluid can include an antibiotic, such as vancomycin hydrochloride. The volume of second fluid to be delivered to the treatment site can vary. The volume of the second fluid to be delivered can be set in a range between 500 mL and 1500 mL, such as, 1200 mL. As discussed elsewhere herein, the second fluid can be delivered in smaller volumes that are allowed to soak and are removed prior to the next volume being delivered to the treatment site. Each volume delivered for each soak period before being removed can be just 50 mL, but can be cycled repeatedly over the course of a single 24-hour period (e.g., about 22 times) such that the total volume is about 1100 mL. The delivery of the second fluid volume can be controlled with an accuracy of ±approximately 5 mL. In some implementations, approximately 50 mL vancomycin hydrochloride are delivered in about 30 seconds.

After, delivery of second fluid to the treatment site, the soaking protocol at the treatment site is performed, similar to what is described at 612 and subsequently, the second fluid (which may include exudate and other fluids in addition to the second fluid from the reservoir that is being delivered for treatment) is removed from the treatment site, similar to what is described at 614.

At 618, treatment data is displayed, as described with reference to FIG. 5C. The displayed treatment data can include real time updated of the treatment during the treatment, such as the name of the treatment phase being performed. The displayed treatment data at a completion of treatment can include a treatment summary, including delivered fluid volumes of each fluid type, and volume of removed fluid. The displayed treatment data at a completion of treatment can optionally include, one or more recommendations, such as a recommendation to charge a battery and/or empty the collecting fluid canister.

The example process 600 or portions of the process 600 can be repeated over multiple (e.g., over 150) cycles for controlled fluid delivery of multiple (two or more) fluids, that can soak the treatment area, and can be removed to prevent merging of different fluids. The example process 600 or portions of the process 600 can be repeated over the course of one week. A single completed cycle following a single user input being received can include at least steps 610+612+614+616+612+614. As discussed above, the second fluid can be repeatedly delivered, allowed to soak, and removed before the first fluid is delivered again, for example, including steps 610+612+614+[x(616+612+614). The system can be pre-set to run a plurality of complete cycles following the single user input over a period of about 24 hours or until a reservoir empties and/or a collection canister fills.

The system can include other alarms and alerts, such as an Excess Fluid Loss alarm, a Therapy Inactive alarm, and/or a System Error alarm, which may be medium priority alarms. The Excess Fluid Loss alarm is activated (i.e., transition from OFF to ON) during a Treatment Vacuum Cycle if greater than 200 cc of fluid enters the canister within a single Treatment Vacuum Cycle. This alarm ensures a user is aware of the total volume of fluid being collected in the canister is reaching a certain level. The Therapy Inactive alarm is activated if the control unit is powered on and the treatment remains inactive for more than a selected period, such as more than 15 minutes. As an example, a treatment day select screen is on for longer than the threshold period after the device is powered on or cycle reset screen is on for longer than the threshold period after a reset. The System Error alarm is activated at any time if the system pressure sensor measured a pressure above a threshold value, for example, less than −162.5 mmHg. The System Error alarm is activated if there is a software failure or corrupted software.

Figure 7:
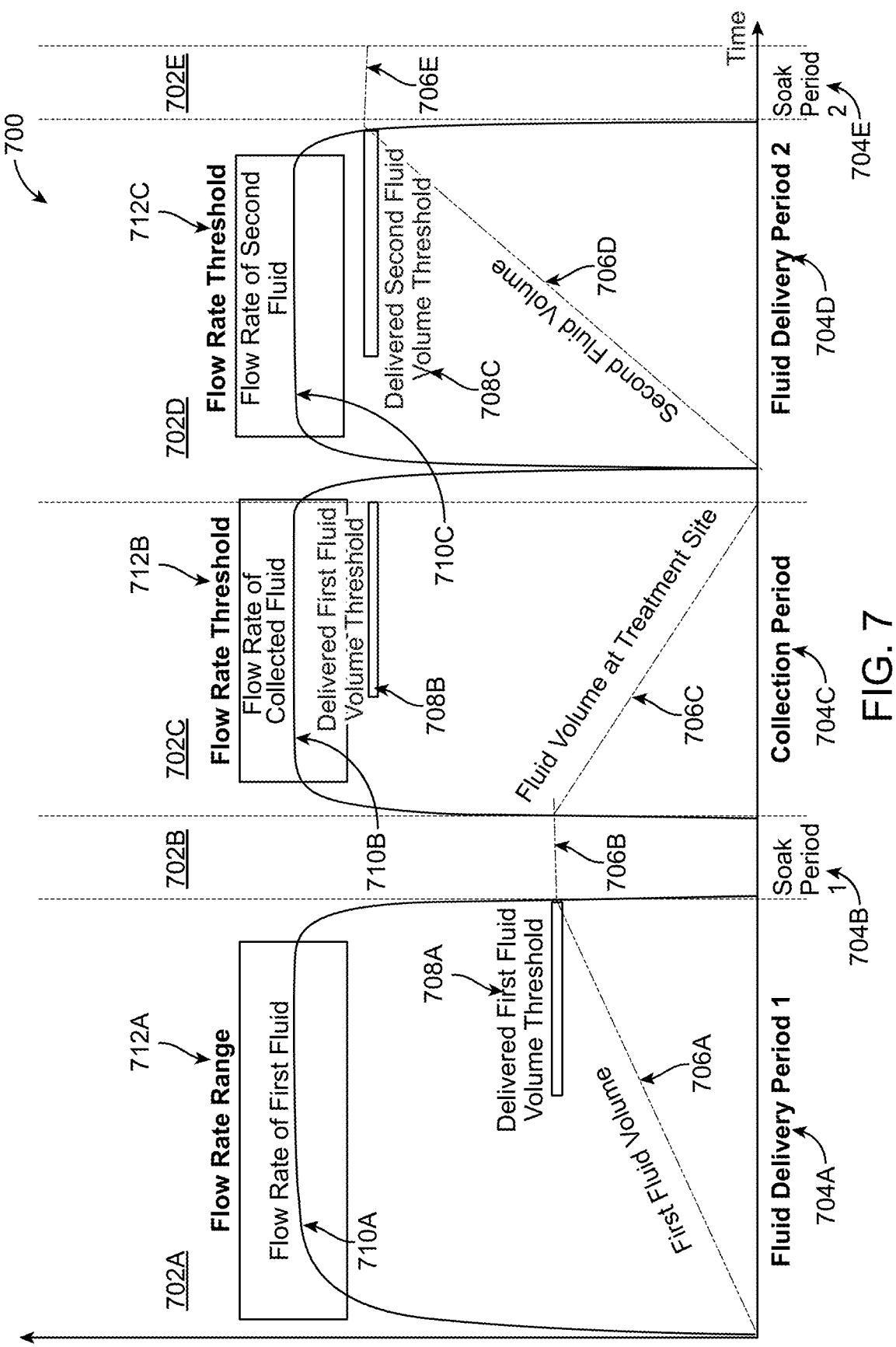
FIG. 7 depicts an example of a parameter time variation diagram corresponding to the process performed by the treatment delivery system, in accordance with some example implementations.

FIG. 7 depicts an example of a parameter diagram 700 corresponding to the process performed by the treatment delivery system (e.g., treatment delivery system 100 described with reference to FIGS. 1A-1D), in accordance with some example implementations. The example parameter diagram 700 can include the parameters determined by the control unit during separate phases 702A, 702B, 702C, 702D, 702E of the treatment using multiple fluid types, as described with reference to FIG. 6.

During a first phase 702A of the treatment, a first fluid type is delivered to a treatment site during a first fluid delivery period 704A. The first fluid volume 706A at the treatment site increases from zero to a set delivered first fluid volume threshold 708A with a particular accuracy (e.g., 5 mL). The first fluid volume 706A at the treatment site, during the first phase 702A of the treatment can be derived based on the variation of the weight of the first fluid reservoir, as measured by a first load cell. The first fluid volume 706A can be delivered at the treatment site at a flow rate of first fluid 710A, which can be approximately constant. The flow rate of the first fluid 710A can be monitored to remain within a set flow rate range 712A.

During a second phase 702B of the treatment, the first fluid is allowed to soak into the treatment area for a set first time period or a first soak period 704B, such that the delivered first fluid volume 706B at the treatment area during the first soak period 704B remains constant.

During a third phase 702C of the treatment, the first fluid is removed from the treatment site and delivered to a collecting fluid canister during a fluid collection period 704C. The fluid volume at the treatment site 706C decreases as the volume of the collected fluid 706E at the collecting fluid canister increases from zero to a set collected volume threshold (e.g., the delivered first fluid volume threshold 708B) with a particular accuracy (e.g., 5 mL). The volume of the collected fluid 706E at the collecting fluid canister can be derived based on the variation of the weight of the collecting fluid canister, as measured by a respective load cell. The collected fluid 706E can be removed from the treatment site at a flow rate of collected fluid 710B, which can be an approximately constant. The flow rate of the collected fluid 710B can be monitored to remain within a set flow rate threshold 712B. In some implementations, the treatment delivery system can automatically transition between treatment phases, for example, in response to determining that a parameter (e.g., fluid volume) reached a corresponding threshold such as a delivered first fluid volume threshold 708B.

During a fourth phase 702D of the treatment, a second fluid type is delivered to the treatment site during a second fluid delivery period 704D. The second fluid volume 706D at the treatment site increases from zero to a set delivered second fluid volume threshold 708C with a particular accuracy (e.g., 5 mL). The second fluid volume 706D at the treatment site, during the second phase 702B of the treatment can be derived based on the variation of the weight of the second fluid reservoir, as measured by the first load cell. The second fluid volume 706D can be delivered at the treatment site at flow rate of the second fluid 710C, which can be approximately constant. The flow rate of the second fluid 710C can be monitored to remain within a set flow rate threshold 712C.

During a fifth phase 702E of the treatment, the second fluid is allowed to soak into the treatment area for a set second time period or second soak period 704E, such that the second fluid volume 706E at the treatment area during the second soak period 704E remains constant. After the fifth phase 702E, the second fluid is removed from the treatment site and delivered to the collecting fluid canister during a further fluid collection period (not shown).

Figure 8:
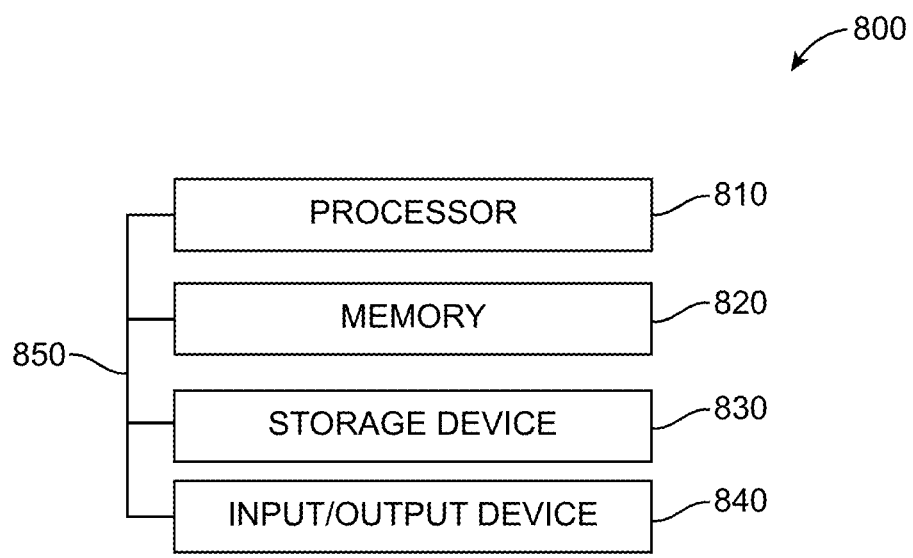
FIG. 8 illustrates a block diagram illustrating an example of a computing system, in accordance with some example implementations.

FIG. 8 depicts a block diagram illustrating an example of computing system 800 consistent with implementations of the current subject matter. The example computing system 800 can be integrated in the control unit of a treatment delivery system, as described with reference to FIGS. 1A-1D, 2A-2F, and 3A and 3B, to execute the process described with reference to FIG. 6.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can be implemented by one or more components of, for example, the treatment delivery system. In some example implementations, the processor 810 can be a single-threaded processor. Alternatively, the processor 810 can be a multi-threaded processor. The processor 810 is capable of processing instructions stored in the memory 820 and/or on the storage device 830 to present graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some example implementations, the input/output device 840 includes a keyboard and/or pointing device. In various implementations, the input/output device 840 includes a display unit for displaying graphical user interfaces.

According to some example implementations, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some example implementations, the computing system 800 can be used to execute various interactive computer software applications that can be used for organization, analysis and/or storage of data in various formats. Alternatively, the computing system 800 can be specifically configured to execute software applications. These applications can perform various fullness detection functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in specifically configured digital electronic circuitry, integrated circuitry, application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

As used herein a "user interface" (also referred to as an interactive user interface, a graphical user interface or a user interface or UI) may refer to a network-based interface including data fields and/or other control elements for receiving input signals or providing electronic information and/or for providing information to the user in response to any received input signals. Control elements may include dials, buttons, icons, selectable areas, or other perceivable indicia presented via the UI that, when interacted with (e.g., clicked, touched, selected, etc.), initiates an exchange of data for the device presenting the UI. A UI may be implemented in whole or in part using technologies such as hyper-text mark-up language (HTML), FLASH™, JAVA™, .NET™, web services, or rich site summary (RSS). In some implementations, a UI may be included in a stand-alone client (for example, thick client, fat client) configured to communicate (e.g., send or receive data) in accordance with one or more of the aspects described. The communication may be to or from a medical device or server in communication therewith.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the receptacle via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine-readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As user herein, the terms "correspond" or "corresponding" encompasses a structural, functional, quantitative and/or qualitative correlation or relationship between two or more objects, data sets, information and/or the like, preferably where the correspondence or relationship may be used to translate one or more of the two or more objects, data sets, information and/or the like so to appear to be the same or equal. Correspondence may be assessed using one or more of a threshold, a value range, fuzzy logic, pattern matching, a machine learning assessment model, or combinations thereof.

In some implementations, data generated or detected can be forwarded to a "remote" device or location, where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A treatment delivery system for treating an infected treatment site of a patient, said system comprising:
   a fluid delivery system for directing a first fluid from a first fluid source to the infected treatment site and for directing a second fluid from a second fluid source to the infected treatment site, wherein the first fluid contains a first therapeutic agent and the second fluid contains a second therapeutic agent, wherein the first therapeutic agent is different from the second therapeutic agent; and
   a control unit programmed to control the fluid delivery system according to a treatment process comprising a plurality of phases, wherein
   a first phase of the treatment process comprises a controlled delivery of the first fluid to the infected treatment site, maintaining the first fluid at the infected treatment site for a first period of time, and removing a first site fluid from the infected treatment site, said first site fluid comprising at least some of the first fluid,
   a second phase of the treatment process comprises a controlled delivery of the second fluid to the infected treatment site, maintaining the second fluid at the infected treatment site for a second period of time, and removing a second site fluid from the infected treatment site, said second site fluid comprising at least some of the second fluid,
   a third phase of the treatment process comprises repeating the second phase of the treatment process with the second fluid at least once, and
   a fourth phase of the treatment process comprises repeating the first phase of the treatment process with the first fluid at least once,
   wherein the treatment process of the control unit automatically activates a first transition from the first phase to the second phase, a second transition from the second phase to the third phase, and a third transition from the third phase to the fourth phase, and wherein, after an initial user activation of the treatment process before the first phase, each of said first, second, third, and fourth phases and the first, second, and third transitions are caused to proceed without further user intervention or input,
   wherein the first fluid comprises tobramycin antibiotic fluid and the second fluid comprises vancomycin antibiotic fluid.

2. The treatment delivery system of claim 1, wherein the first period of time is different from the second period of time.

3. The treatment delivery system of claim 1, wherein the first period of time is longer than the second period of time.

4. A treatment delivery system for treating an infection of a treatment site of a patient, said system comprising:
   a fluid delivery system for directing a first fluid from a first fluid source to the infected treatment site and for directing a second fluid from a second fluid source to the infected treatment site, wherein the first fluid contains a first antibiotic agent for treating the infection and the second fluid contains a second antibiotic agent for treating the infection, wherein the first antibiotic agent is different from the second antibiotic agent; and
   a control unit programmed to control the fluid delivery system according to a treatment process comprising a plurality of phases, wherein
   a first phase of the treatment process comprises a controlled delivery of the first fluid to the infected treatment site, maintaining the first fluid at the infected treatment site for a first period of time of at least 15 minutes, and removing a first site fluid from the infected treatment site, said first site fluid comprising at least some of the first fluid,
   a second phase of the treatment process comprises a controlled delivery of the second fluid to the infected treatment site, maintaining the second fluid at the infected treatment site for a second period of time of at least 15 minutes, and removing a second site fluid from the infected treatment site, said second site fluid comprising at least some of the second fluid, and
   a third phase of the treatment process comprises repeating the second phase of the treatment process with the second fluid at least once,
   wherein the treatment process of the control unit automatically activates a first transition from the first phase to the second phase, and a second transition from the second phase to the third phase, and wherein, after an initial user activation of the treatment process before the first phase, each of said first, second and third phases and the first and second transitions are caused to proceed without further user intervention or input.

5. The treatment delivery system of claim 4, wherein the first fluid source comprises a first fluid reservoir and the second fluid source comprises a second fluid reservoir, and wherein the first fluid is delivered from the first fluid reservoir to the infected treatment site and wherein the second fluid is delivered from the second fluid reservoir to the infected treatment site.

6. The treatment delivery system of claim 4, further comprising:
a first load cell configured to detect a combined weight comprising a first weight of the first fluid and the first fluid source and a second weight of the second fluid and the second fluid source, wherein the control unit processes the combined weight measured at a first point in time and at a second point in time later than the first point, in order to monitor a status of fluid delivery.

7. The treatment delivery system of claim 6, wherein the status of fluid delivery comprises at least one of a first volume of the first fluid delivered from the first fluid source and a second volume of the second fluid delivered from the second fluid source.

8. The treatment delivery system of claim 6, wherein the first load cell is arranged within a vertical plane of the system and is configured to be contacted horizontally by a cantilevered hanger component.

9. The treatment delivery system of claim 8, further comprising a waste fluid canister configured to collect the first site fluid and the second site fluid removed from the infected treatment site.

10. The treatment delivery system of claim 9, further comprising a second load cell configured to detect a waste weight of the waste fluid canister and any fluid within the waste fluid canister, wherein the control unit processes the waste weight to monitor a status of fluid removal.

11. The treatment delivery system of claim 10, wherein when the waste weight equals or exceeds a threshold, an alarm is triggered.

12. The treatment delivery system of claim 10, wherein the second load cell is arranged within the vertical plane of the system and is configured to be contacted horizontally by a second cantilevered hanger component.

13. The treatment delivery system of claim 9, further comprising:
a waste fluid canister fill sensor configured to generate a waste fluid canister fill alert indicating a fill level of the waste fluid canister being above a fill threshold during the treatment process, wherein the control unit stops removal of any of the first fluid and the second fluid from the infected treatment site in response to the waste fluid canister fill alert.

14. The treatment delivery system of claim 6, further comprising:
an empty fluid reservoir alarm configured to generate an alert indicating that a weight of the first fluid delivered or a weight of the second fluid delivered is below a minimum threshold corresponding to a respective phase of the plurality of phases.

15. The treatment delivery system of claim 4, wherein the fluid delivery system further comprises at least one pinch valve controlled by the control unit to open and close according to the treatment process.

16. The treatment delivery system of claim 15, wherein the at least one pinch valve of the fluid delivery system comprises a first pinch valve and a second pinch valve, wherein the first pinch valve is configured to receive a first fluid delivery line adapted to be fluidly connected to the first fluid source and the second pinch valve is configured to receive a second fluid delivery line adapted to be fluidly connected to the second fluid source.

17. The treatment delivery system of claim 16, wherein the first pinch valve is controlled by the control unit to be open during the first phase and is controlled by the control unit to be closed during the second phase, wherein the second pinch valve is controlled by the control unit to be closed during the first phase and is controlled by the control unit to be open during the second phase.

18. The treatment delivery system of claim 16, wherein the first pinch valve has a first inner dimension when in an open configuration and wherein the second pinch valve has a second inner dimension when in an open configuration, wherein the first inner dimension is different than the second inner dimension.

19. The treatment delivery system of claim 18, wherein the first fluid delivery line has a smaller outer dimension than the second fluid delivery line, the smaller outer dimension sized to be received within the first inner dimension of the first pinch valve.

20. The treatment delivery system of claim 18, wherein the second fluid delivery line has an outer dimension large enough to be unable to be received within the first inner dimension of the first pinch valve.

21. The treatment delivery system of claim 4, wherein the control unit comprises:
a pump configured to generate a set vacuum pressure; and
a valve configured to control a vacuum relief.

22. The treatment delivery system of claim 21, wherein the pump is powered off during at least the first phase.

23. The treatment delivery system of claim 21, wherein the pump is configured to run at an approximately constant voltage during a first phase and at an approximately constant torque during a second phase to generate the set vacuum pressure.

24. The treatment delivery system of claim 21, further comprising:
a leak alarm configured to generate an alert indicating a pressure leak determined in response to the control unit detecting a vacuum pressure at the infected treatment site being below a threshold.

25. The treatment delivery system of claim 4, further comprising:
a low battery alarm configured to generate an alert indicating a charge level of a battery of the control unit, wherein the charge level of the battery is determined in response to the control unit detecting the charge level of the battery being below a minimum charge level adequate for powering automatic transition between the plurality of phases.

26. The treatment delivery system of claim 4, further comprising:
an incorrect assembly alarm configured to generate an alert indicating an incorrect assembly of the treatment delivery system, wherein the incorrect assembly is determined in response to the control unit detecting a missing or incorrectly coupled component of the treatment delivery system that prevents an automatic transition between the plurality of phases.

27. The treatment delivery system of claim 4, further comprising:
a motion alarm configured to pause fluid delivery and generate an alert indicating an excessive motion that affects a weight sensor reading during fluid delivery.

28. The treatment delivery system of claim 4, further comprising a user interface configured to receive a user input comprising a selection of an operation for initiating a sequence comprising the plurality of phases.

29. The treatment delivery system of claim 4, wherein the delivery of the first fluid to the infected treatment site comprises directing a discrete volume of about 6 mL to about 500 mL of the first fluid from the first fluid source.

30. The treatment delivery system of claim 4, wherein the first antibiotic agent comprises tobramycin and the second antibiotic agent comprises vancomycin.

31. The treatment delivery system of claim 30, wherein the first period of time is longer from the second period of time.

32. The treatment delivery system of claim 4, wherein maintaining the first fluid at the infected treatment site for the first period of time comprises allowing the first fluid to soak within the infected treatment site after controlled delivery of the first fluid and before removing the first site fluid.

33. The treatment delivery system of claim 32, wherein the first period of time is 1 hour to 3 hours.

34. The treatment delivery system of claim 32, wherein removing the first site fluid from the infected treatment site comprises removing the first site fluid after allowing the first fluid to soak and before instilling more fluid to the infected treatment site.

35. The treatment delivery system of claim 4, wherein maintaining the second fluid at the infected treatment site for the second period of time comprises allowing the second fluid to soak within the infected treatment site after controlled delivery of the second fluid and before removing the second site fluid.

36. The treatment delivery system of claim 35, wherein the second period of time is 15 minutes to 45 minutes.

37. The treatment delivery system of claim 35, wherein removing the second site fluid from the infected treatment site comprises removing the second site fluid after allowing the second fluid to soak and before instilling more fluid to the infected treatment site.

38. The treatment delivery system of claim 4, wherein the controlled delivery of the second fluid to the infected treatment site comprises directing a discrete volume of the second fluid from the second fluid source that is less than a total volume of the second fluid in the second fluid source.

39. The treatment delivery system of claim 38, wherein the discrete volume is about 50 mL and the total volume is about 500 mL to about 1500 mL.

40. The treatment delivery system of claim 4, further comprising a negative pressure source, wherein the negative pressure source is inactive during the first phase while the first fluid is maintained at the infected treatment site for the first period of time and is also inactive during the second phase while the second fluid is maintained at the infected treatment site for the second period of time, and wherein the first site fluid is removed from the treatment site during the first phase via negative pressure after the control unit activates the negative pressure source, and the second site fluid is removed from the treatment site during the second phase via negative pressure after the control unit again activates the negative pressure source.

41. The treatment delivery system of claim 4, wherein a flow rate of the first fluid increases from zero to be within a set flow rate range during the controlled delivery of the first fluid to the treatment site so that a first fluid volume within the treatment site increases, and
wherein the flow rate of the first fluid decreases back to zero during maintaining the first fluid at the infected treatment site so that the first fluid volume within the treatment site remains constant, and
wherein a flow rate of the first site fluid increases from zero to be within a set flow rate range during removing the first site fluid from the infected treatment site so that the first fluid volume within the treatment site decreases.

42. The treatment delivery system of claim 4, wherein a flow rate of the second fluid increases from zero to be within a set flow rate range during the controlled delivery of the second fluid to the treatment site so that a second fluid volume within the treatment site increases, and
wherein the flow rate of the second fluid decreases back to zero during maintaining the second fluid at the infected treatment site so that the second fluid volume within the treatment site remains constant, and
wherein a flow rate of the second site fluid increases from zero to be within a set flow rate range during removing the second site fluid from the infected treatment site so that the second fluid volume within the treatment site decreases.

* * * * *